United States Patent
Hashemi

(10) Patent No.: US 10,849,048 B2
(45) Date of Patent: Nov. 24, 2020

(54) QUICK BLOCKAGE DISCOVERY AND RECOVERY IN MULTI-HOP ROUTING

(71) Applicant: SONY CORPORATION, Tokyo (JP)

(72) Inventor: Morteza Hashemi, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 18 days.

(21) Appl. No.: 16/242,671

(22) Filed: Jan. 8, 2019

(65) Prior Publication Data

US 2020/0221367 A1    Jul. 9, 2020

(51) Int. Cl.
| | |
|---|---|
| *H04W 40/28* | (2009.01) |
| *H04W 40/12* | (2009.01) |
| *H04W 40/22* | (2009.01) |
| *H04W 40/24* | (2009.01) |
| *H04W 40/34* | (2009.01) |
| *H04W 84/12* | (2009.01) |

(52) U.S. Cl.
CPC ........... *H04W 40/28* (2013.01); *H04W 40/12* (2013.01); *H04W 40/22* (2013.01); *H04W 40/246* (2013.01); *H04W 40/248* (2013.01); *H04W 40/34* (2013.01); *H04W 84/12* (2013.01)

(58) Field of Classification Search
CPC ... H04W 40/28; H04W 40/246; H04W 40/12; H04W 40/22; H04W 40/34; H04W 40/248; H04W 84/12
See application file for complete search history.

(56) References Cited

U.S. PATENT DOCUMENTS

| | | | |
|---|---|---|---|
| 2009/0228575 A1* | 9/2009 | Thubert | H04L 45/128 709/220 |
| 2016/0150459 A1* | 5/2016 | Patil | H04L 45/72 370/328 |
| 2016/0242056 A1* | 8/2016 | Patil | H04W 76/14 |
| 2017/0055305 A1* | 2/2017 | Kurian | H04W 76/14 |

* cited by examiner

Primary Examiner — Dady Chery
(74) Attorney, Agent, or Firm — O'Banion & Ritchey; John P. O'Banion

(57) ABSTRACT

A wireless communication apparatus, system or method utilizing for performing data transmission over a communication band (e.g., directional mmW) which maintains a primary and at least one backup route for communications between a source and destination station. Route discovery and response messages are utilized along with route request and reply update messages in maintaining primary and one or more backup routes from a source to destination station. Locally overcoming blockage conditions to select another route if it is available, and communicating route status information to neighbor stations, with each station proactively assuring that its routing table entries are up-to-date and that multiple next-hop options are reachable and ready to be deployed at any time.

20 Claims, 21 Drawing Sheets

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| Octets: 2 | 2 | 6 | 6 | 3 | 3 | 4 |

FIG. 7
(Prior Art)

| | B0 | B1 | B9 | B10 | B15 | B16 | B17 | B18 | B23 |
|---|---|---|---|---|---|---|---|---|---|
| | Direction | CDOWN | | Sector ID | | DMG Antenna ID | | RXSS Length | |
| Bits: | 1 | 9 | | 6 | | 2 | | 6 | |

FIG. 8
(Prior Art)

| | B0 | B8 | B9 | B10 | B11 | B15 | B16 | B17 | B23 |
|---|---|---|---|---|---|---|---|---|---|
| | Total sectors in ISS | | Number of RX DMG antennas | | Reserved | | Poll Required | Reserved | |
| Bits: | 9 | | 2 | | 5 | | 1 | 7 | |

FIG. 9A
(Prior Art)

| | B0 | B5 | B6 | B7 | B8 | B15 | B16 | B17 | B23 |
|---|---|---|---|---|---|---|---|---|---|
| | Sector select | | DMG Antenna select | | SNR report | | Poll Required | Reserved | |
| Bits: | 6 | | 2 | | 8 | | 1 | 7 | |

FIG. 9B
(Prior Art)

QUICK BLOCKAGE DISCOVERY AND RECOVERY IN MULTI-HOP ROUTING

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to the multiple-hop routing over primary and backup routes.

2. Background Discussion

The need for faster and more robust wireless network communication is becoming increasingly important. In response to the need of reaching these higher capacities, network operators have begun to embrace various concepts to achieve densification. Current sub-6 GHz wireless technology is not sufficient to cope with high data demands. One alternative is to utilize additional spectrum in the 30-300 GHz band which is often referred to as the millimeter wave band (mmW).

To efficiently utilize mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmW communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmW D2D and DN technologies.

The majority of existing technologies for DN address discovery for networks operating in broadcast mode are not targeted to networks with directional wireless communications. In addition, those technologies which utilize directional wireless network communications often have very high overhead demands in regards to the generation of beacon signals. Still further, these technologies lack sufficient mechanisms for reducing the overhead and latencies involved with performing discovery.

Current mmW communication systems rely on directional communications to gain sufficient link budget between the transmitter (Tx) and the receiver (Rx). For a station to access the channel it first listens to check if the medium is either occupied or free. The listening phase is usually performed using a quasi-Omni antenna, and in many instances this results in channel access being blocked although the transmission or reception direction is not affected by actual directional signal.

The task of establishing a multi-hop communication network in mmW band is much more challenging due to directionality, compared with Omni-directional communications in low frequency band systems. The challenges in this process can be summarized as: (a) knowledge of surrounding nodes IDs; (b) knowledge of best transmission patterns for beamforming to neighbors; (c) channel access issues arising due to collisions and deafness; and (d) channel impairments due to blockage and reflections.

Existing technologies often fail in regard to their use of directional mmW communications to provide quick discovery and recovery from blockages and other channel impairments.

Accordingly, a need exists for enhanced mechanisms for efficiently utilizing directional mmW communications to speedily detect and provide recovery from blockages and impairments. The present disclosure fulfills these needs and provides additional benefits over previous technologies.

BRIEF SUMMARY

An apparatus and method are disclosed for a network station to efficiently switch to alternative route options and notify other neighbor stations (STAs) about this change. In the previous work of the inventor, when a blockage arises, the routing protocol needs to exchange more routing messages in order to find alternative routes. The present disclosure provides novel local recovery actions with new types of message exchanges. In addition, the protocol tracks multiple next-hop options and assures that they are ready to be deployed immediately when the need arises. If any of the backup options are not reachable, the disclosure utilizes a low system overhead (lightweight) version of route discovery to find alternatives among the neighboring STAs.

To achieve this goal, this present disclosure teaches a novel method for taking local action by the STAs in order to reduce the time required for restoring the end-to-end route. In addition, in this protocol other STAs are notified about this route change. Moreover, a novel method is disclosed by which the protocol determines alternative neighbor STAs for the blocked STA, or a replacement for the STA that is not reachable anymore. Thus, the disclosure solves the issue of finding alternative routes under link blockage in wireless communications systems.

Thus, the disclosed wireless station protocol describes utilizing a set of actions for achieving a seamless transition between multi-hop routing options when the primary route from the originating STA to destination STA is blocked. One important feature of the disclosure is its ability to perform local actions by the blocked STA in order to avoid any interruption in data transfer until a global optimal routing option is determined, toward drastically reducing delays (overhead), such as required by the prior art system, when obtaining an optimal route.

A mechanism is described for replacing the blocked STA, with the transmitter STA of that link seeking to obtain a replacement for the blocked STA among its neighbor STAs, and thus it maintains its routing table filled with alternative next-hop STA options. Moreover, all STAs according to this protocol utilize a proactive link maintenance process to assure their routing table entries are valid and up-to-date. This is achieved using status request (SREQ) and status reply (SREP) messages between neighbor STAs. However, if one of the entries in the routing table does not respond to an SREQ ping message, then it is considered that this neighbor is not reachable and that it needs to be replaced. Toward maintaining the routing tables, the disclosure utilizes sending of a route request update (RREQU) to a complement set of neighbor STAs and finding a replacement for the unreachable neighbor STA.

The teachings of the present disclosure can be applied to wireless LAN (WLAN), wireless personal area networks (WPAN), device-to-device (D2D), peer-to-peer (P2P), mesh networks, and outdoor wireless communications. Thus, the disclosed technology can be utilized in a wide range of target applications, the following being provided by way of example and not limitation: Wi-Fi, WiGig, Wi-Fi type networks, Internet of things (IoT) applications, backhauling and fronthaul of data, indoor and outdoor distribution networks, mesh networks, next generation cellular networks with D2D communications, and so forth.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

DETAILED DESCRIPTION

Figure 1:
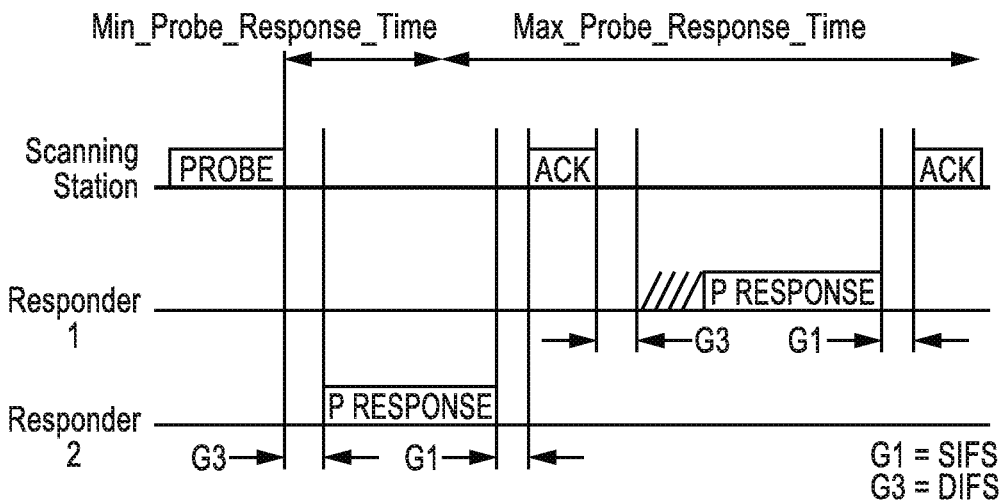
FIG. 1 is a timing diagram of active scanning performed in an IEEE 802.11 wireless local area network (WLAN).

The disclosure provides for quickly detecting blockage conditions and performing local actions to select another route if it is available, followed by communicating route status information to one or more neighbor stations, with each station proactively assuring that its routing table entries are up-to-date and that multiple next-hop options are reachable and ready to be deployed at any time.

When used in this disclosure the following terms have the meanings generally described below.

AODV: Ad-hoc On-Demand Distance Vector (AODV) is a routing protocol designed for wireless and mobile ad-hoc networks for establishing on-demand routes to destinations.

Beamforming (BF): a directional transmission from a directional antenna system or array, and not an Omni-directional or quasi-Omni antenna, for determining information for improving received signal power or signal-to-noise ratio (SNR) at the intended receiver, and under which stations can obtain information for correlating time and directional allocation information.

BI: the Beacon Interval is a cyclic super frame period that represents the time between beacon transmission times.

BSS: Basic Service Set, is a set of stations (STAs) that have successfully synchronized with an AP in the network. A component of the IEEE 802.11 WLAN architecture, built around a BSS which is actually a set of STAs connecting to the wireless medium allowing the STAs to communicate with each other.

BTI: Beacon Transmission Interval, is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

CSMA/CA: is Carrier-Sense Multiple Access with Collision Avoidance is a network multiple access method in which carrier sensing is utilized.

DMG: Directional Multi-Gigabit are a form of high throughput wireless communications described in IEEE 802.

DN STA: distributed network (DN) station (DN STA) is a station (STA) that implements the DN facility. A DN STA that operates in the DN BSS may provide the distribution services for other DN STAs.

DTI: Data Transfer Interval is the period in which full BF training is permitted followed by actual data transfer. The DTI can include one or more service periods (SPs) and contention-based access periods (CBAPs).

FCS: is a Frame Check Sequence providing error-detecting code added to a frame in a communications protocol.

LOS: Line-of-Sight, a communication in which the transmitter and receiver are ostensibly within sight of one another, and not the result of communication of a reflected signal. The opposite condition is NLOS for non-line-of-sight, wherein stations are not in LOS with one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

Omni-directional: a mode of transmission utilizing a non-directional antenna.

Quasi-Omni directional: is a mode of communication utilizing a directional multi-gigabit (DMG) antenna with the widest beamwidth attainable.

NAV information: is information for a virtual carrier-sensing mechanism used with wireless network protocols, such as IEEE 802.11.

RA: is the Recipient Address to which data is to be communicated.

RREP: Routing Reply; a message frame that is generated by the destination STA and contains information about the originating STA.

RREQ: Routing request; a message frame that is generated by the originating STA and contains information about the destination STA.

RREQU: Routing Request Update; a message frame generated for obtaining information from neighboring STAs to updating routing information.

RREPU: Routing Reply Update; a message frame generated for replying to an RREQU.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SREQ: Status Request; a message frame that is generated by each STA and is used to check if the next-hop STAs are alive and the routing table entries are valid. SREQ is also used to update the link metric.

SREP: Status Reply; a message frame that is generated in response to the status request (SREQ) message.

SSID: service Set Identifier is the name assigned to a WLAN network.

STA: Station (or node) is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector Sweep (SSW) or Directional Multi-gigabit (DMG) Beacon frames via different sectors, in which a sweep is performed between consecutive transmissions.

1. Existing Directional Wireless Network Technology 1.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

1.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
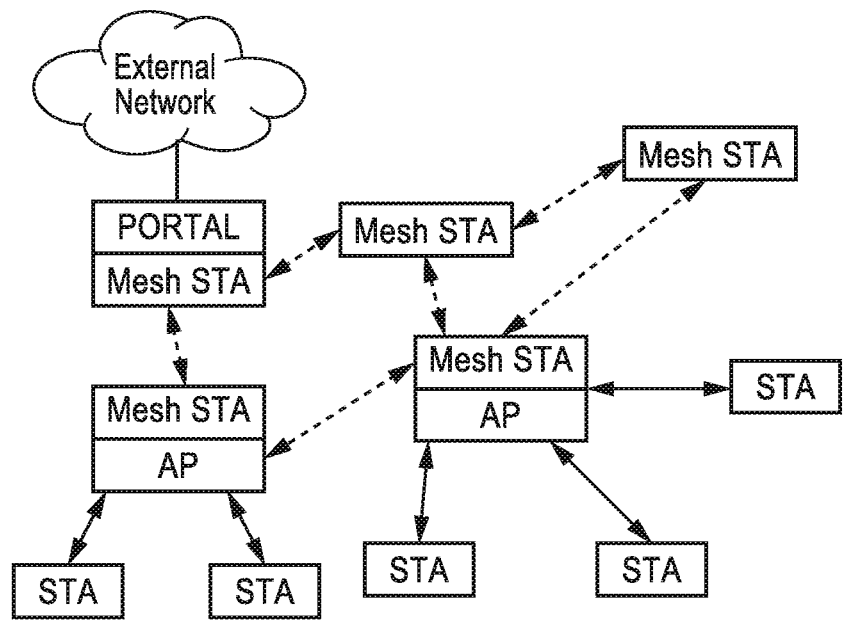
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
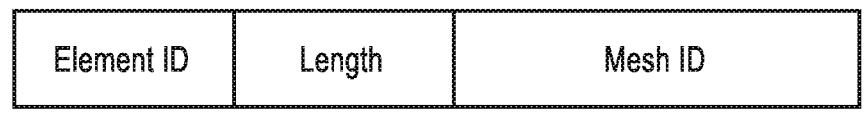
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmW WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provided the best link quality (e.g. SNR).

Figure 5:
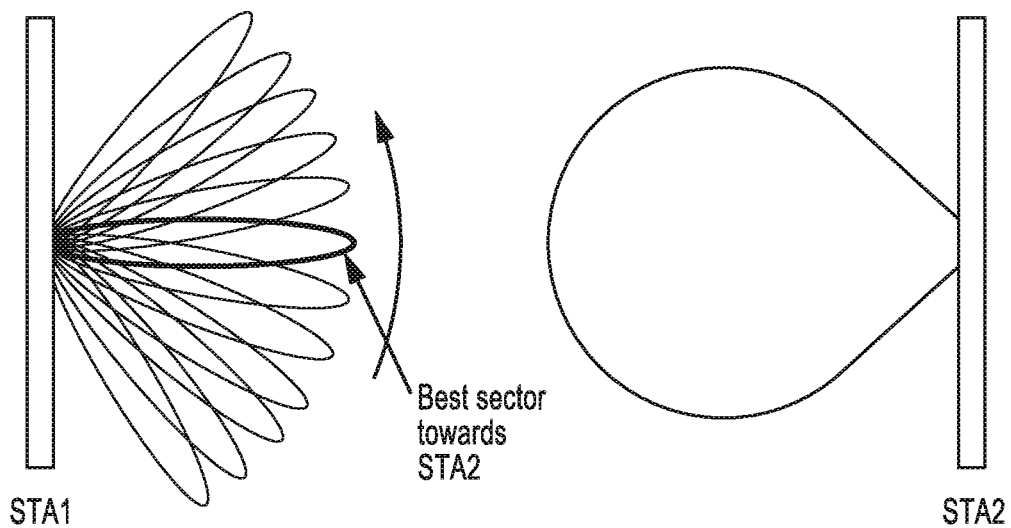
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
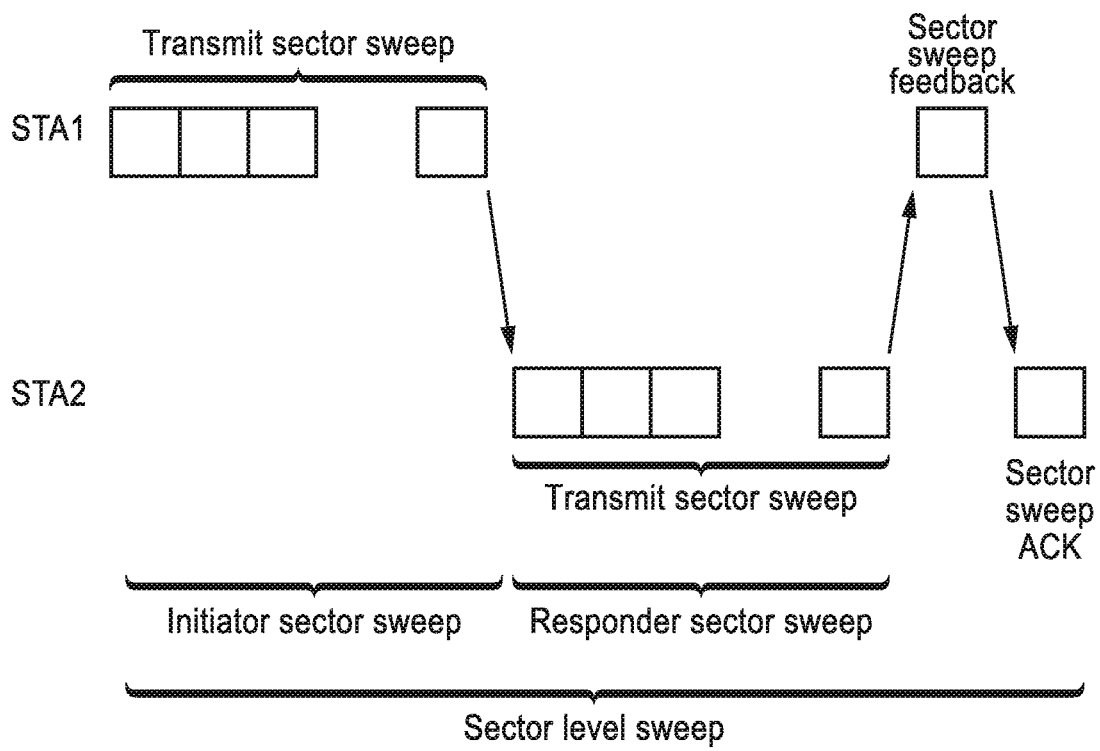
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

1.5. AODV Routing Protocol

Figure 10A:
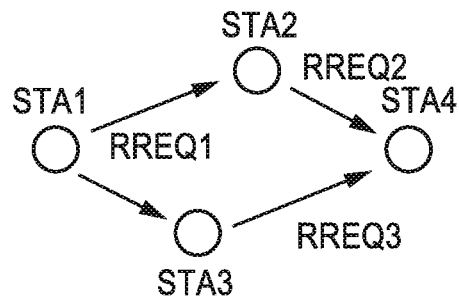
FIG. 10A through FIG. 10C is a network topology diagram of an Ad-hoc On-Demand Distance Vector (AODV) routing protocol.
Figure 10B:
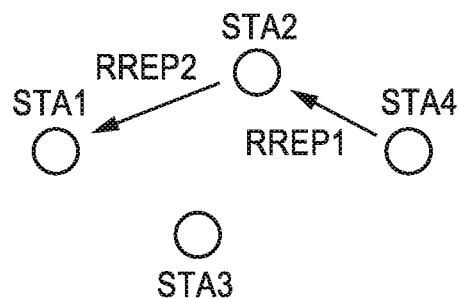
Figure 10C:
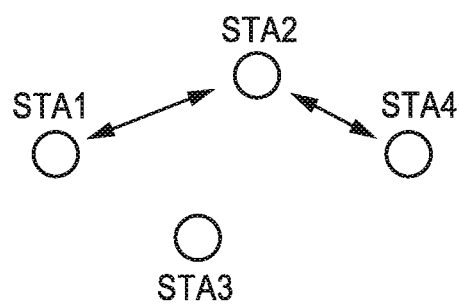

FIG. 10A through FIG. 10C illustrates an example of using an Ad-hoc On-Demand Distance Vector (AODV) routing protocol. A routing protocol is a set of rules to establish a communication path between an originating station (STA) and a destination STA over multiple hops (Intermediate STAs). AODV is a routing protocol which represents the general essence of current multi-hop routing over a wireless media. With AODV, STAs generates a route according to the following steps as seen in the example of FIG. 10A through FIG. 10C.

Steps 1 through 5 of this AODV routing process are see in FIG. 10A. (1) STA 1 is the originating STA and it broadcasts Routing Request (RREQ) frames (RREQ1). (2) STA 2 receives the RREQ1 and measures quality of the link between itself and the transmitter of the RREQ1 (STA 1), and rebroadcasts the RREQ embedding the link quality info and transmitting a routing request (RREQ2). (3) STA3 receives RREQ1, measures quality of the link between itself and transmitter of the RREQ1 (STA1), and rebroadcasts the RREQ embedding the link quality info (RREQ3). (4) STA4 as the destination STA receives RREQ2 from STA2, measures quality of the link between itself and the transmitter of the RREQ2 (STA2), and accumulates the value with link quality embedded in the RREQ2. In response to this process STA4 obtains information on the end-to-end quality to and from STA1 via STA2. (5) STA4 also receives an RREQ3 from STA3, measures quality of the link between itself and the transmitter of the RREQ3 (STA3), and accumulates the value with the link quality embedded in RREQ3. Accordingly, STA4 also obtains information on the end-to-end quality to and from STA1 via STA3.

Steps 6 through 8 of this AODV routing process are depicted in FIG. 10B. (6) STA4 determines that the link quality to STA1 via STA2 is better (e.g., higher signal-to-noise ratio (SNR)) than via STA3, and so STA4 transmits a routing response (RREP) frame (RREP1) to STA2 to confirm the best route to intermediate and originating STAs, and sets STA2 as the next hop STA toward STA1. (7) STA2 receives this RREP1 from STA4, and recognizes itself as an intermediate STA between STA4 and STA1, and set STA4 as its next hop STA toward STA4. (8) STA2 then further retransmits the RREP (RREP2) toward originating STA1, and sets STA1 as the next hop STA toward STA1.

Steps 9 through 10 of this AODV routing process are depicted in FIG. 10C. (9) STA1 receives RREP2 from STA2, and recognizes that the multi-hop path toward STA4 has been confirmed and the next hop STA to STA4 is STA2. (10) In response to the above sequence, a bidirectional route between STA1 and STA4 via STA2 is established.

2. Station (STA) Hardware Configuration of Disclosure

Figure 11:
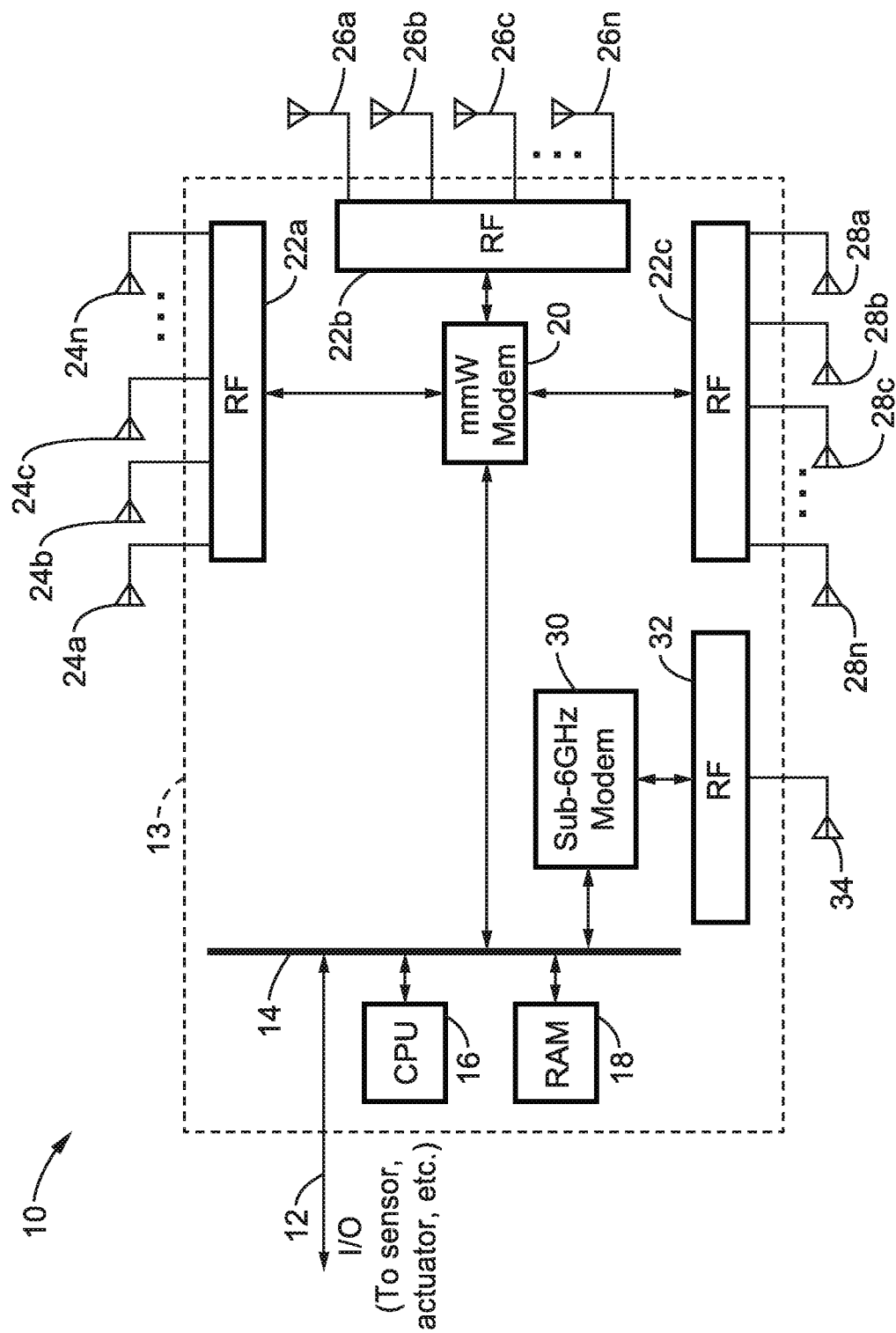
FIG. 11 is a block diagram of wireless mmW communication station hardware as utilized according to an embodiment of the present disclosure.

FIG. 11 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, and destination), depending on what role it is playing in the current communication context. This host machine is shown configured with a mmW modem 20 coupled to radio-frequency (RF) circuitry 22a, 22b, 22c to a plurality of antennas 24a through 24n, 26a through 26n, 28a through 28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
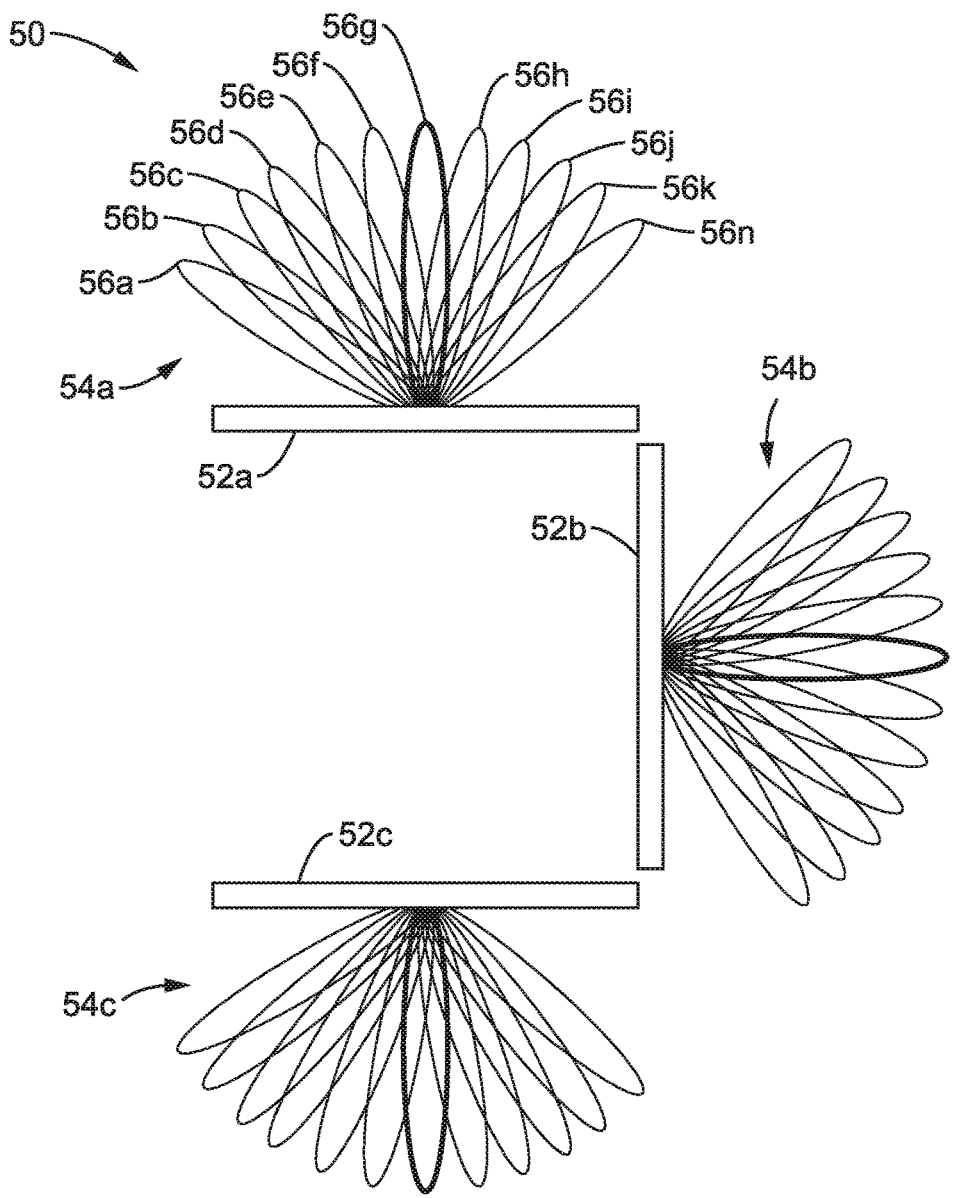
FIG. 12 is a mmW beam pattern diagram for the station hardware of FIG. 10 as utilized according to an embodiment of the present disclosure.

FIG. 12 illustrates an example embodiment 50 of mmW antenna directions which can be utilized by a STA to generate a plurality (e.g., 36) of mmW antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmW RF circuitry and beamforming commanded by the mmW array antenna controller. Although it is possible that STA hardware components have different functional partitions from the one described above, such configurations can be deemed to be a variant of the explained configuration. Some of the mmW RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 13:
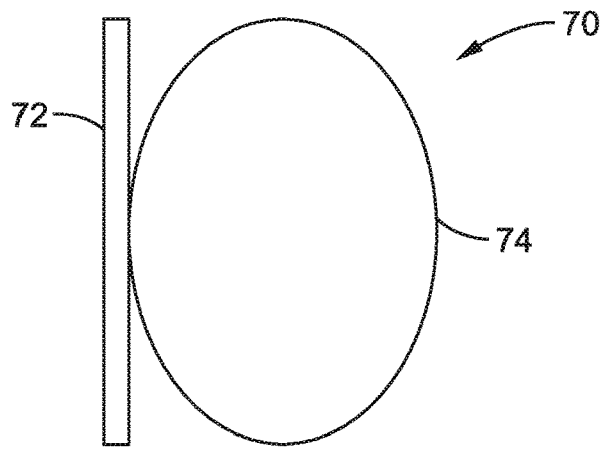
FIG. 13 is a beam pattern diagram for a discovery band communications antenna (i.e., sub-6 GHz), according to an embodiment of the present disclosure.

FIG. 13 illustrates an example embodiment 70 of antenna pattern for the sub-6 GHz modem assumed to use a quasi-Omni antenna 74 attached to its RF circuitry 72, although other circuitry and/or antennas may be utilized without limitation.

3. Introduction to Quick Blockage Discovery and Recovery

It is important in numerous wireless applications to quickly detect and replace blocked links in order to avoid an interruption in data delivery. This disclosure is applicable to various networks, and not limited to millimeter wave directional networking.

Current multi-hop routing protocols do not consider discovering and keeping track of multiple next-hop options when they set up routing protocols at the STAs. As a result, these existing wireless protocols incur high delay and rediscovery overheads when the primary route is blocked. In contrast to this, the present disclosure discovers next-hop options and maintains them so that they are ready to be deployed at any time without any additional setup overhead under a blockage scenario.

To achieve the above objectives a new message flooding mechanism is taught utilizing route request (RREQ) and route reply (RREP) messages, as well as route request update (RREQU) and route reply update (RREPU) message in order to discover several routes between the originating STA and destination STA and maintain routing table entries, including primary and backup routes.

In typical multi-hop networking, a route from the originating STA to the destination STA is determined by selecting intermediate STAs for the end-to-end path. Often, the intermediate STAs are chosen which offer best link quality, as seen in the AODV example. However, in mmW, links are sensitive to blockage and other channel impairments. However, for time-sensitive applications, it is essential that the blocked link is quickly detected and replaced with an alternative link.

The present disclosure is built upon a previous application by the assignee describing a multi-hop routing protocol which maintains multiple routing options (e.g., a primary and at least one backup option) to reach to the destination STA.

The protocol according to this disclosure is configured to automatically perform one or more courses of action in response to detecting erroneous situations listed as follows: (a) when a broken link is detected; and (b) when one of the next-hop options is not reachable and it needs to be replaced with another STA.

In order to provide multi-hop communications with multiple next-hop options, and the ability to quickly discover and recover communications in response to error conditions, the disclosed protocol includes the following actions: (a) under blockage scenario, a blocked STA would take a local action, when possible, and then it updates certain of its neighbor STAs with routing information; (b) each STA proactively assures that its routing table entries are up-to-date with multiple next-hop options that are reachable and ready to be deployed at any time. In this case, if a next-hop STA (either primary or backup) is not reachable (e.g., blocked), the STA sends a route request update to the complement set of its neighbors (excluding those STAs that are reachable) in order to find a replacement for the STA that is not reachable.

Therefore, the disclosure provides a protocol for communication stations as a mechanism to discover and recover alternative routes under erroneous conditions, such as when a blockage arises or when one of the next-hop STAs to reach to the destination STA is not reachable and thus it needs to be replaced.

4. Neighbor Lists and Routing Tables

4.1. Neighbor List

Information obtained from performing the antenna sector sweep is utilized in the STA building a database, which is referred to herein as a Neighbor List, within which it stores received signal quality information for each antenna section for the STA in its memory. In at least one embodiment, each instance of the Neighbor List is also configured to store miscellaneous information on the neighbor STA. The object of the Neighbor List is to allow each STA to be made aware of its neighbor STAs so that the best transmit/receive sectors can be selected.

By way of example and not limitation, consider a field used for each neighbor with an entry in that field containing receive quality (RxQuality) for each direction for that station. For the previous topology example of FIG. 10A through FIG. 10C, it will be noted that STA 1 recognizes STA 2 and STA 3 as its neighbor STAs, and creates 2 instances of the Neighbor List entry. STA 1 then stores receive link quality information to RxQuality[N], where N is associated with Tx Antenna Sector of the neighbor STA.

4.2. Routing Table

In the following descriptions an originating station (source) is considered a station (STA) which initiates a communication to another station (STA) which is referred to as the destination station. Routing Tables are constructed as an outcome from the route discovery process, which will be explained in the later clause. Prior to transmitting a data frame to a destination STA, the originating STA sets up a route to the destination STA. The route to the destination STA is managed based on a Routing Table. The Routing Table contains a record (herein depicted in a column form) per destination STA, so that the originating STA can look up the record for the destination STA in preparation for transmitting a frame to the destination STA.

When a STA has a data frame to transmit to a destination STA, it looks up this destination in the Routing Table, and sets the Reception Address (RA) field of the frame to an address stored in NextHop. Each STA maintains a routing table which provides information on reaching destination STAs. Information for each destination STA is stored in a record (e.g., column) of the routing table. For instance in the examples described, each column of the routing table contains the following information: (a) Destination: indicating the destination STA address; (b) NextHop: which indicates the immediate next-hop STA in order to reach to the Destination STA; (c) Metric: is a value that determines distance to the destination STA using NextHop STA; (d) Lifetime: indicates the expiration time of routing information to use NextHop; (e) Backup NextHop: is the backup next-hop STA that can be used to reach to the Destination STA in case the NextHop is not reachable (e.g., due to blockage); (f) Backup Metric: is a value that determines distance to the destination STA if the backup next hop is deployed. (g) Backup Lifetime: indicates the expiration time of routing information to use Backup NextHop.

Figure 14:
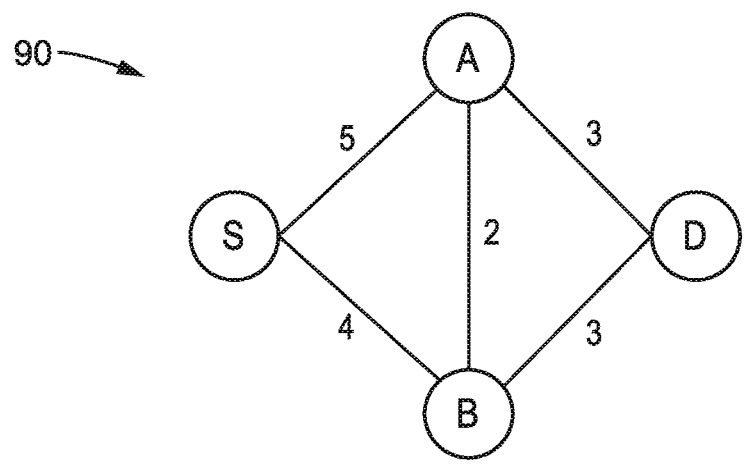
FIG. 14 is a network topology diagram of four example stations as utilized according to an embodiment of the present disclosure.

FIG. 14 illustrates an example network 90 showing a number of stations. It should be appreciated that this, and other topologies exemplified herein, are only presented by way of example as the present disclosure is not limited to the use of any specific network topology. In the figure each edge represents a bi-directional link between two nodes and is labeled with a link metric, specifically in this case the distance of that edge between stations. The source STA is marked as "S" and destination STA is marked as "D". As a result, Table 1 is obtained as the routing table for the origination station S to reach to destination station D.

4.3. Forwarding Tables

Each STA has one Forwarding Table through which it keeps track of the type of frames (RREQ or RREP) that it has forwarded to its neighbor STAs along with the sequence number and metric of the message. The forwarding Table has one column (record) per neighbor STA, and in at least one example embodiment it contains the following elements. (a) Neighbor: is the address of the neighbor STA. (b) OrigSTA: is the originating STA of the routing management frame that has been forwarded to the Neighbor node. (c) SeqNum: is the Sequence number of the routing management frame that has been sent to Neighbor node. (d) Type: is the type (RREQ/RREP) of routing management frame that has been sent to Neighbor node. (e) Metric: is the metric of the routing management frame that has been sent to Neighbor node.

Upon receiving several copies of the same routing management frame, (same OrigSTA and same SeqNum) at an STA, the STA picks the best frame (based on the metric) and forwards it to its neighbor STAs, excluding the transmitter of the message. Thereafter, the STA updates its Forwarding Table entries for its neighbors. Table 2 illustrates an example Forwarding Table of Originating STA S for the network shown in FIG. 14.

4.4. Multi-Hop Routing with Multiple Next Hop Nodes

The example of a mmW network consists of several STA nodes is considered in which there are several intermediate STAs capable of relaying data traffic from the originating STA to the destination STA (depending on the connectivity and link configurations between STAs). In order to establish multi-hop routes, the originating STA sends a route request (RREQ) to its neighbor STAs, assuming that the STAs have previously performed a Sector Sweep (SSW). Each one-hop neighbor (in direct range) of the originating STA receives the RREQ frame and updates its routing table with an entry to the originating STA. Each neighboring STA then forwards the RREQ to its one-hop neighbors as well, excluding the originating STA from which the RREQ was received.

Figure 15:
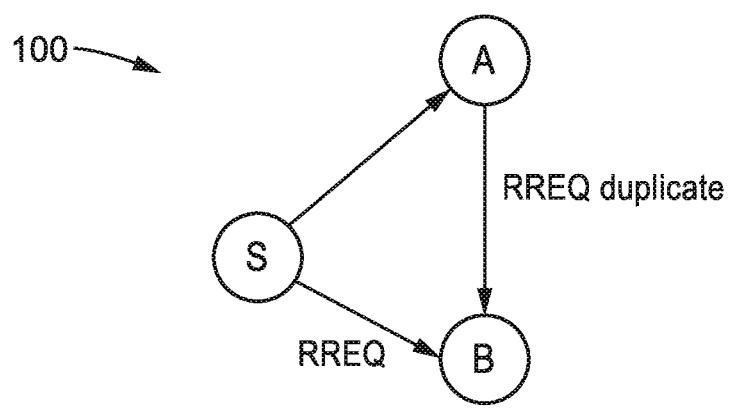
FIG. 15 is a network topology diagram of three example stations as utilized according to an embodiment of the present disclosure.

FIG. 15 illustrates an example embodiment 100 showing a network with three STAs, with STA B receiving a first Routing Request (RREQ) frame from the originating STA and another RREQ from its one-hop neighbor STA A when STA A forwards the RREQ to its neighbors (that includes B as well). Thus, it is seen that as the forwarding of RREQs continues, intermediate STAs may receive duplicate RREQs from other STAs.

In response to receiving RREQ messages, the protocol determines what the best RREQ and second best RREQ frames are in terms of the metric, to decide the next-hop and backup next-hop node to the originating STA in the routing table of the Relay STA. In the example above, STA B sets A as the backup next-hop to reach to Node S, assuming that the direct link metric from S to B is more beneficial (e.g., less delay, improved SNR, etc.) metric than the sum of the link metrics S to A and A to B.

For each neighbor STA, the STA determines the best received RREQ, excluding the RREQ that has been received from the same neighbor STA, and forwards the best RREQ to its neighbor STA, and records the forwarding action in its Forwarding Table. The destination STA receives potentially several RREQ messages, and sends an Routing Reply (RREP) frame to the same STA from which a RREQ was received at the destination. Each Relay (intermediate) STA that receives an RREP message, updates its routing table to the destination STA. If the Relay STA receives more than one RREP, it selects the best RREP frame and forwards it to its one-hop neighbor STAs, and records the forwarding operation in its Forwarding Table. Similar to RREQ frames, each RREP frame and its duplicate versions determine the next-hop and backup next-hop. The process of forwarding RREP frames continues until the RREP message is received at the originating STA. According to this process, the originating STA potentially receives more than one RREP message, and it selects a hierarchy of routes, first best and second best in this example, based on the RREP messages and records them as the next-hop and backup next-hop to reach to the Destination STA.

4.5. Routing Management Frame Format

4.5.1. Routing Request (RREQ) and Routing Reply (RREP)

Figure 16:
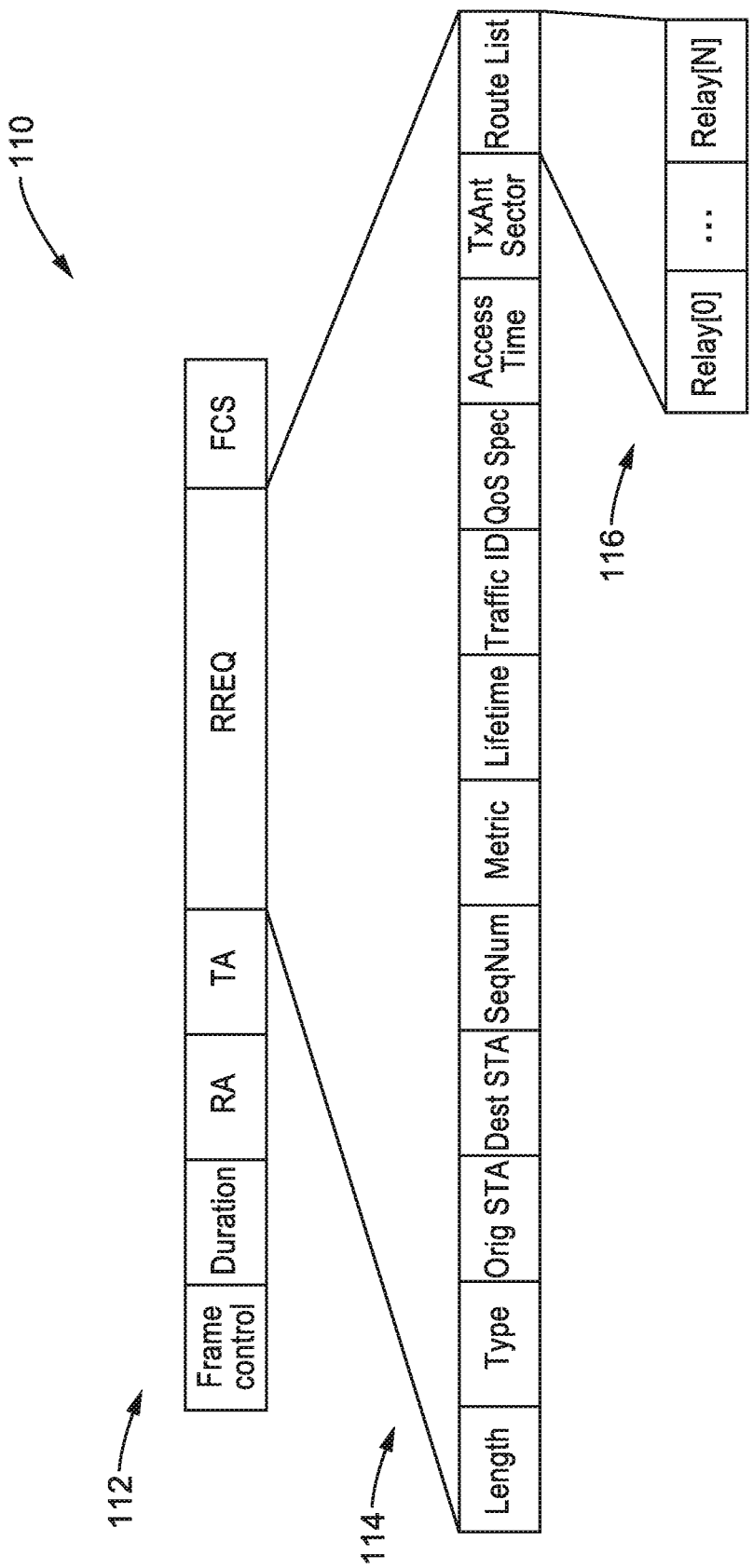
FIG. 16 is a data field diagram of a route request frame (RREQ) message according to an embodiment of the present disclosure.

FIG. 16 illustrates an example embodiment 110 of an RREQ frame 112 and its subfields 114, 116. The Frame 112 contains: (a) a Frame Control field indicating the type of frame; (b) a Duration field containing NAV information (virtual carrier-sensing mechanism) used for Carrier-Sense Multiple Access with Collision Avoidance (CSMA/CA) channel access; (c) Recipient Address (RA) field contains address of the recipient of the frame; (d) The Transmitting Address (TA) field contains the address of the STA that transmits the frame; (e) An RREQ field containing routing request particulars described below; and (f) A Frame Check Sequence (FCS) field is included in the RREQ frame.

The subfields 114 contained within the RREQ field contain: (a) Length: indicating the length of this frame; (b) Type: as the type of this frame (RREQ); (c) Orig STA: is the address of the Originating STA; (d) Dest STA: is the address of the Destination STA; (e) SeqNum: is the Sequence Number identifying this route set up, and is a value updated (e.g., incremented) every time the originating STA attempts to set up or maintain the route; (f) Metric: is a measurement which carries accumulated metric value toward the destination STA; (g) Lifetime: is the lifetime to the expiration time of this route; (h) Traffic ID: is the Traffic Identification of the associated traffic stream; (i) QoS Spec: is a traffic specification of this traffic stream (i.e., bandwidth, or similar traffic specifier); (j) Access Time: the channel time that the Transmitting Address (TA) STA uses for the transmission of data frames toward the Reception Address (RA) STA; (k) TxAnt-Sector: is the Transmit (Tx) Antenna Sector that TA STA uses for the transmission of the data frames toward RA STA. (l) Route List: is the ID of the STAs that this frame has reached (visited) so far, in which an ID of a STA is appended to each RREQ message as seen in sub-fields 116, when it receives that frame.

Figure 17:
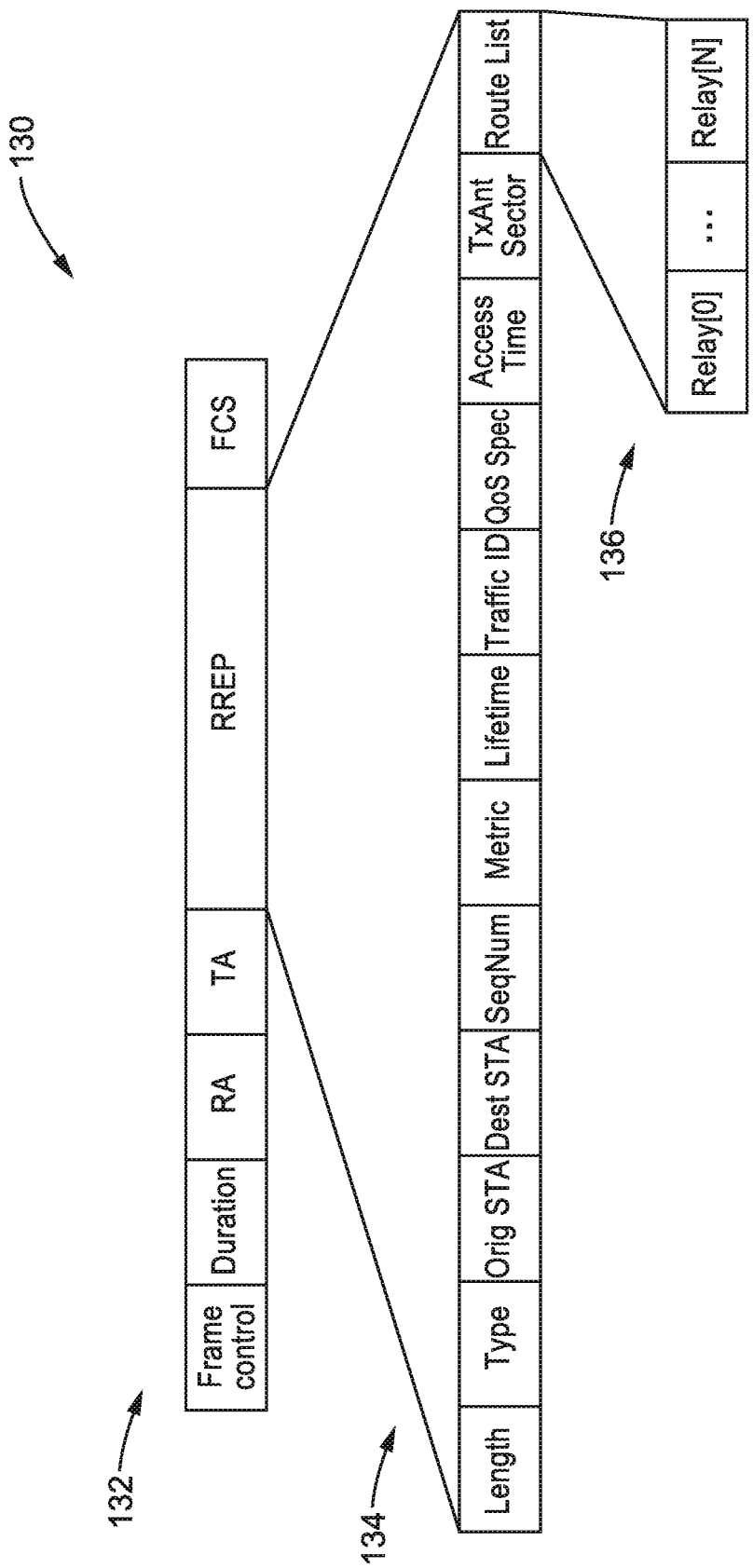
FIG. 17 is a data field diagram of a route reply frame (RREP) message according to an embodiment of the present disclosure.

FIG. 17 illustrates an example embodiment 130 of the RREP frame 132, and its sub-frame hierarchy 134 and 136. The RREP frame 132 contains the following fields: (a) a Frame Control field indicating the type of frame; (b) a Duration field containing NAV information (virtual carrier-sensing mechanism) used for Carrier-Sense Multiple Access with Collision Avoidance (CSMA/CA) channel access; (c) Recipient Address (RA) field contains address of the recipient of the frame; (d) The Transmitting Address (TA) field contains the address of the STA that transmits the frame; (e) An RREP field containing routing request particulars described below; and (f) A Frame Check Sequence (FCS) field is included in the RREQ frame.

The subfields 134 contained within the RREP field above contain the following sub-fields: (a) Length: indicating the length of this frame; (b) Type: as the type of this frame (RREP); (c) Orig STA: is the address of the Originating STA; (d) Dest STA: is the address of the Destination STA; (e) SeqNum: is the Sequence Number identifying this route reply, and the same as the RREQ being replied to; (f)

Lifetime: is the lifetime to the expiration time of this route reply; (g) Traffic ID: is the Traffic Identification of the associated traffic stream; (h) QoS Spec: is a traffic specification of this traffic stream (i.e., bandwidth, or similar traffic specifier); (i) Access Time: the channel time that the Transmitting Address (TA) STA uses for the transmission of data frames toward the Reception Address (RA) STA; (j) TxAntSector: is the Transmit (Tx) Antenna Sector that TA STA uses for the transmission of the data frames toward RA STA; (k) Route List: is the ID of the STAs that this RREP frame has reached (visited) so far, in which an ID of a STA is appended to each RREP message as seen in sub-fields 136, when it receives that frame.

4.5.2. Status Request (SREQ) and Status Reply (SREP).

Figure 18:
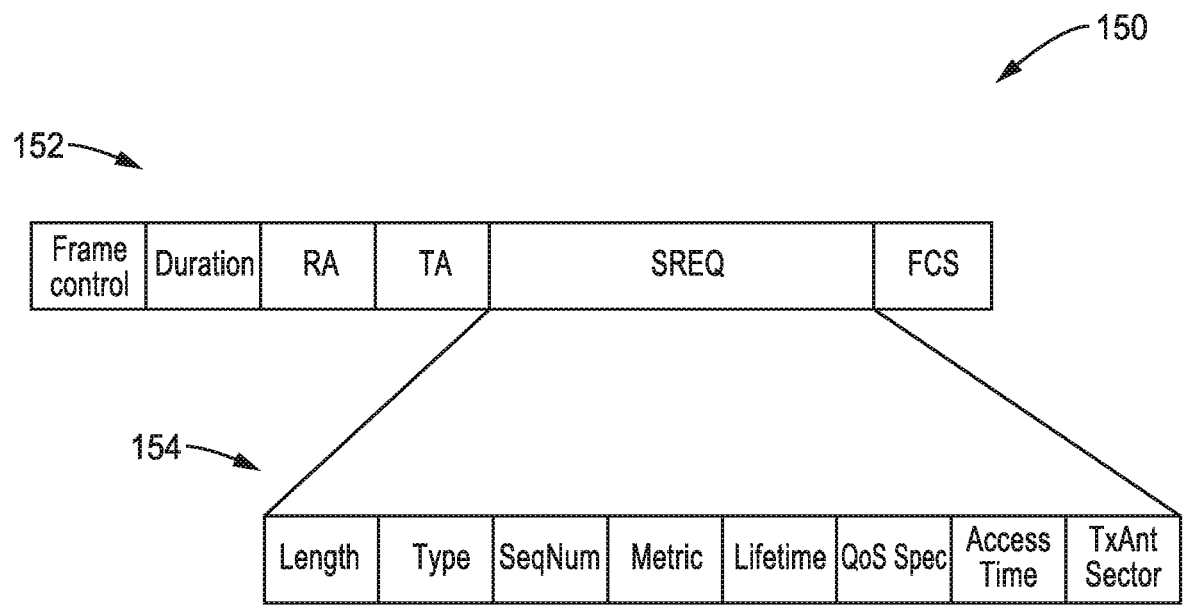
FIG. 18 is a data field diagram of a status request frame (SREQ) message according to an embodiment of the present disclosure.

FIG. 18 illustrates an example embodiment 150 of a Status Request frame 152 and its sub-fields 154. The SREQ frame 152 contains the following fields: (a) a Frame Control field indicating the type of frame; (b) a Duration field containing NAV information used for CSMA/CA channel access; (c) Recipient Address (RA) field contains address of the recipient of the frame; (d) The Transmitting Address (TA) field contains the address of the STA that transmits the frame; (e) An SREQ field containing routing request particulars described below; and (f) A Frame Check Sequence (FCS) field is included in the RREQ frame.

The SREQ field contains the following sub-fields 154: (a) Length: length of this frame; (b) Type: type of this frame (SREQ); (c) SeqNum: is the Sequence Number identifying this SREQ frame, and is updated (e.g., incremented) every time the TA sends a new status request message; (d) Metric: is a link metric from the transmitter STA to receiver STA; (e) Lifetime: is the lifetime to the expiration time of this request; (f) QoS Spec: is a traffic specification of this traffic stream (i.e., bandwidth, or similar traffic specifier); (g) Access Time: is the channel time that the TA STA (the STA identified by the TA field) uses for the transmission of data frames toward RA STA (the STA identified by the RA field); (h) TxAntSector: is the Tx Antenna Sector that the TA STA uses for the transmission of the data frames toward RA STA.

Figure 19:
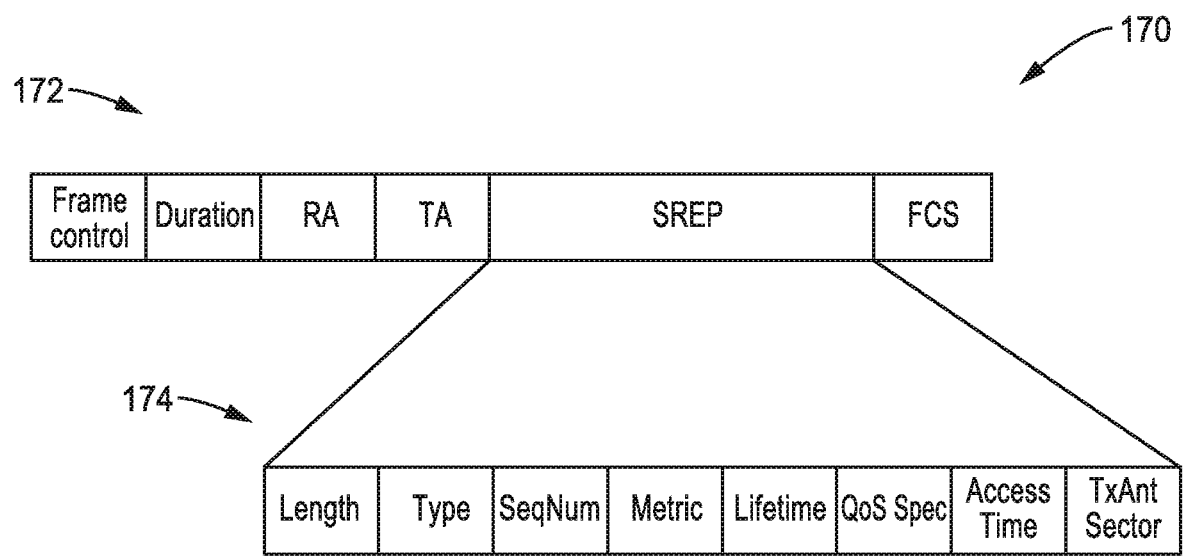
FIG. 19 is a data field diagram of a status reply frame (SREP) message by the originating station (STA) according to an embodiment of the present disclosure.

FIG. 19 illustrates an example embodiment 170 of a Status Reply frame 172 and its sub-fields 174. The SREP frame 172 contains identical fields to that of the SREQ frame except for having an SREP field, instead of an SREQ field.

4.5.3. Route Request Update (RREQU)

Figure 20:
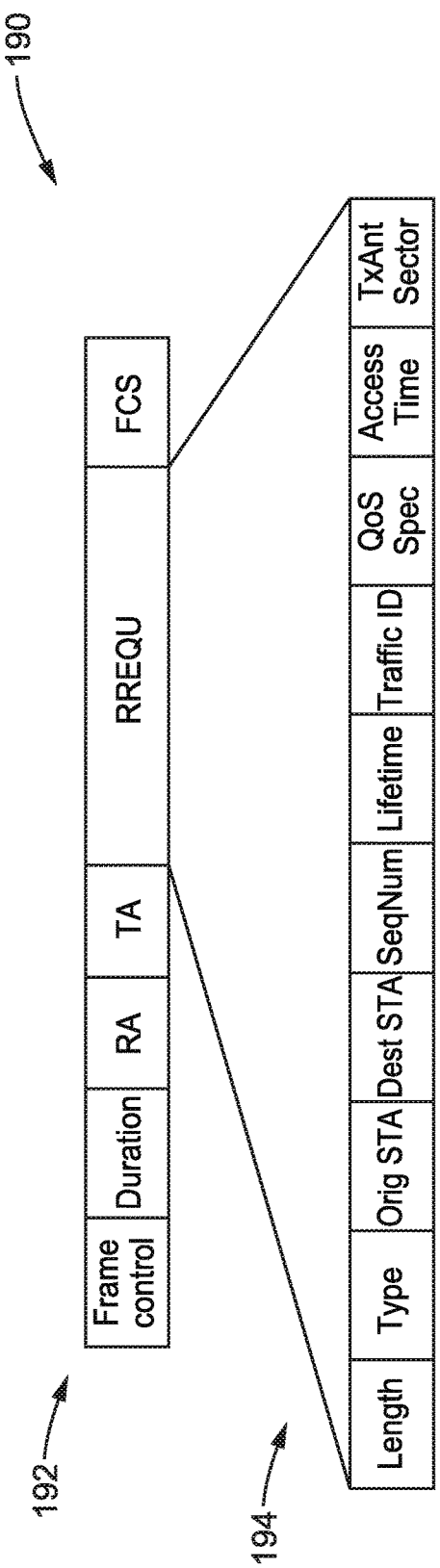
FIG. 20 is a data field diagram of a route request update (RREQU) message by according to an embodiment of the present disclosure.

FIG. 20 illustrates an example embodiment 190 of a Route Request Update (RREQU) frame (message) showing fields 192. The RREQU frame contains the following fields: (a) Frame Control field indicates the type of the frame; (b) Duration field contains NAV information used for CSMA/CA channel access; (c) RA field contains address of the recipient of the frame; (d) TA field contains the address of the STA that transmits the frame; (e) RREQU field contains subfields 194 described below; and (f) Frame Check Sequence (FCS) field is included in the RREQ frame.

The RREQU element 194 contains the following fields: (a) Length: length of this frame; (b) Type: type of this frame (RREQU); (c) Orig STA: address of the originating STA that generates the RREQU; (d) Dest STA: address of the destination STA that should receive the RREQU; (e) SeqNum: Sequence Number identifying this route request update; (f) Lifetime: lifetime to the expiration time of this route reply; (g) Traffic ID: Traffic ID of the associated traffic stream; (h) QoS Spec: traffic specification of this traffic stream, i.e., bandwidth, etc.; (i) Access Time: the channel time that TA STA (the STA identified by the TA field) uses for the transmission of data frames toward RA STA (the STA identified by the RA field); (j) TxAntSector: Tx Antenna Sector that TA STA uses for the transmission of the data frames toward RA STA.

4.5.4. Route Reply Update (RREPU)

Figure 21:
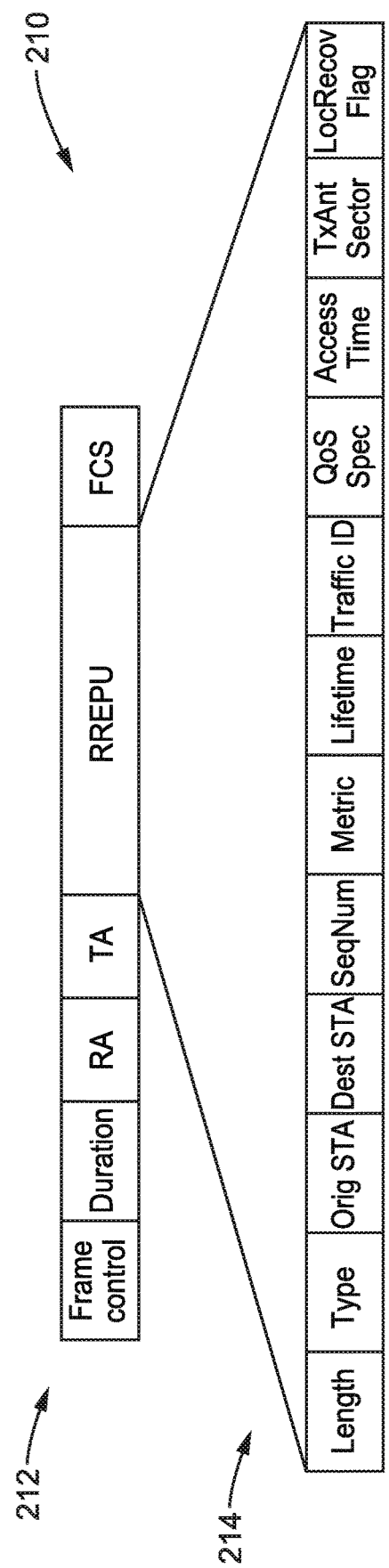
FIG. 21 is a data field diagram of a route reply update (RREPU) message according to an embodiment of the present disclosure.

FIG. 21 illustrates an example embodiment 212 of a Route Reply Update (RREPU) frame (message), having the following fields: (a) Frame Control field indicates the type of the frame; (b) Duration field contains NAV information used for CSMA/CA channel access; (c) RA field contains address of the recipient of the frame; (d) TA field contains address of the STA that transmits the frame; (e) the subfields of the RREPU field are described below; and (f) a Frame Check Sequence (FCS) field.

The RREPU element 214 contains the following fields: (a) Length: length of this frame; (b) Type: type of this frame (RREPU); (c) Orig STA: address of the originating STA that generates the RREPU; (d) Dest STA: address of the destination STA that should receive the RREPU; (e) SeqNum: Sequence Number identifying this route reply update frame; (f) Metric: carries accumulated metric value toward the destination STA; (g) Lifetime: lifetime to the expiration time of this route reply update; (h) Traffic ID: Traffic ID of the associated traffic stream; (i) QoS Spec: traffic specification of this traffic stream, such as bandwidth and so forth; (j) Access Time: the channel time that TA STA (the STA identified by the TA field) uses for the transmission of data frames toward RA STA (the STA identified by the RA field); (k) TxAntSector: Tx Antenna Sector that TA STA uses for the transmission of the data frames toward RA STA; (l) LocRecov Flag: local recovery flag that is set to true if the STA has taken a local action and has switched to its backup next-hop STA. Otherwise LocRecov Flag is set to false.

4.6. Route Request Update and Route Reply Update Logic

During communication operations it is assumed that a transmitter STA sends data traffic to the next-hop option that is a receiver STA. Acknowledgment messages from the next-hop node are sent back to the transmitter in response to the data traffic. The protocol of the present disclosure considers several indicators to detect if the link from the transmitter STA to the receiver STA is blocked, including at least the following. (a) If there is no acknowledgement received from the receiver STA, in which case the transmitter STA detects that there is a blockage. (b) If an STA (other than the transmitter/receiver STA) receives a route reply update message from the transmitter STA, announcing that there is a blockage on the link (between the transmitter STA and receiver STA) and there should be some actions taken to recover from blockage. Both of these scenarios trigger a Recovery under Blockage action as described below.

4.6.1. Blockage Recovery

Figure 22:
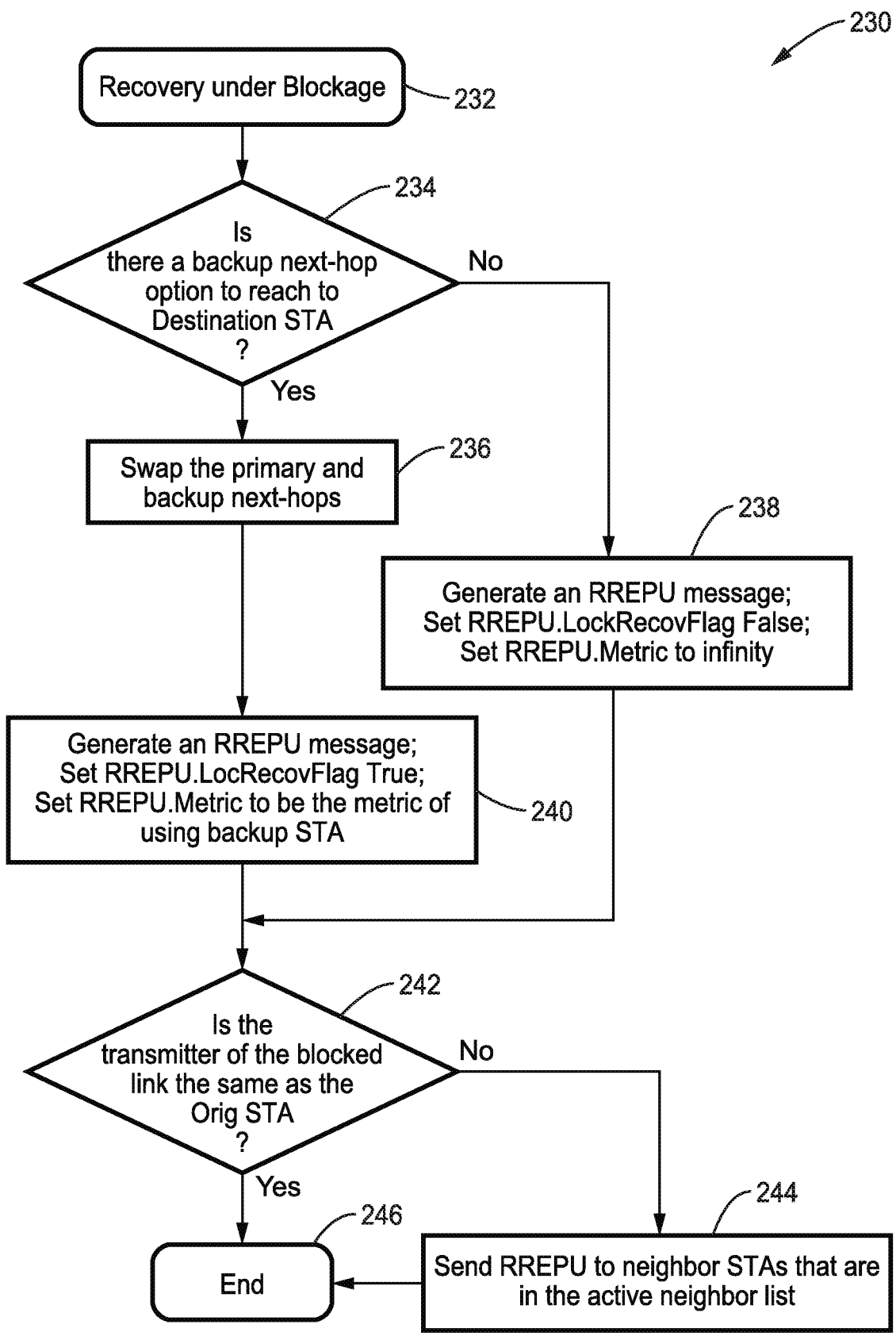
FIG. 22 is a flow diagram of update logic for performing recovery using route request update message in response to blockage conditions according to an embodiment of the present disclosure.

FIG. 22 illustrates an example embodiment 230 of Update Logic for performing recovery under blockage. In response to blockage this process commences 232, and first checks 234 the routing table to see if there is any backup option to reach to the destination STA.

If there is a backup option detected at block 234, then the STA switches 236 to the backup option and generates (creates) 240 an RREPU message and sets the local recovery flag to true. If there is no backup option detected at block 234, then execution reaches block 238 and the STA only generates an RREPU with local recovery flag set to false, and the STA propagates the RREPU to the STAs in its active neighbor list.

Following blocks 240 and 238, a check is made 242 if the STA is the same as the original STA of data traffic (i.e., STA is a relay node). If the station is the same as the original STA of the data traffic, then execution ends at block 246. Otherwise, if it is a different station, then the STA sends 244 the RREPU to those STAs which rely on the STA for their routing purposes. These STAs are called the active neighbor list and include those neighbor STAs from which either a status request message has been received or they have been sending data traffic to the STA.

4.6.2. Route Reply Update Reception

It was seen above, that when a blockage arises, the STA according to this protocol generates an RREPU frame and propagates this to its active neighbor list, the logic for receiving and processing RREPU messages is described below.

Figure 23:
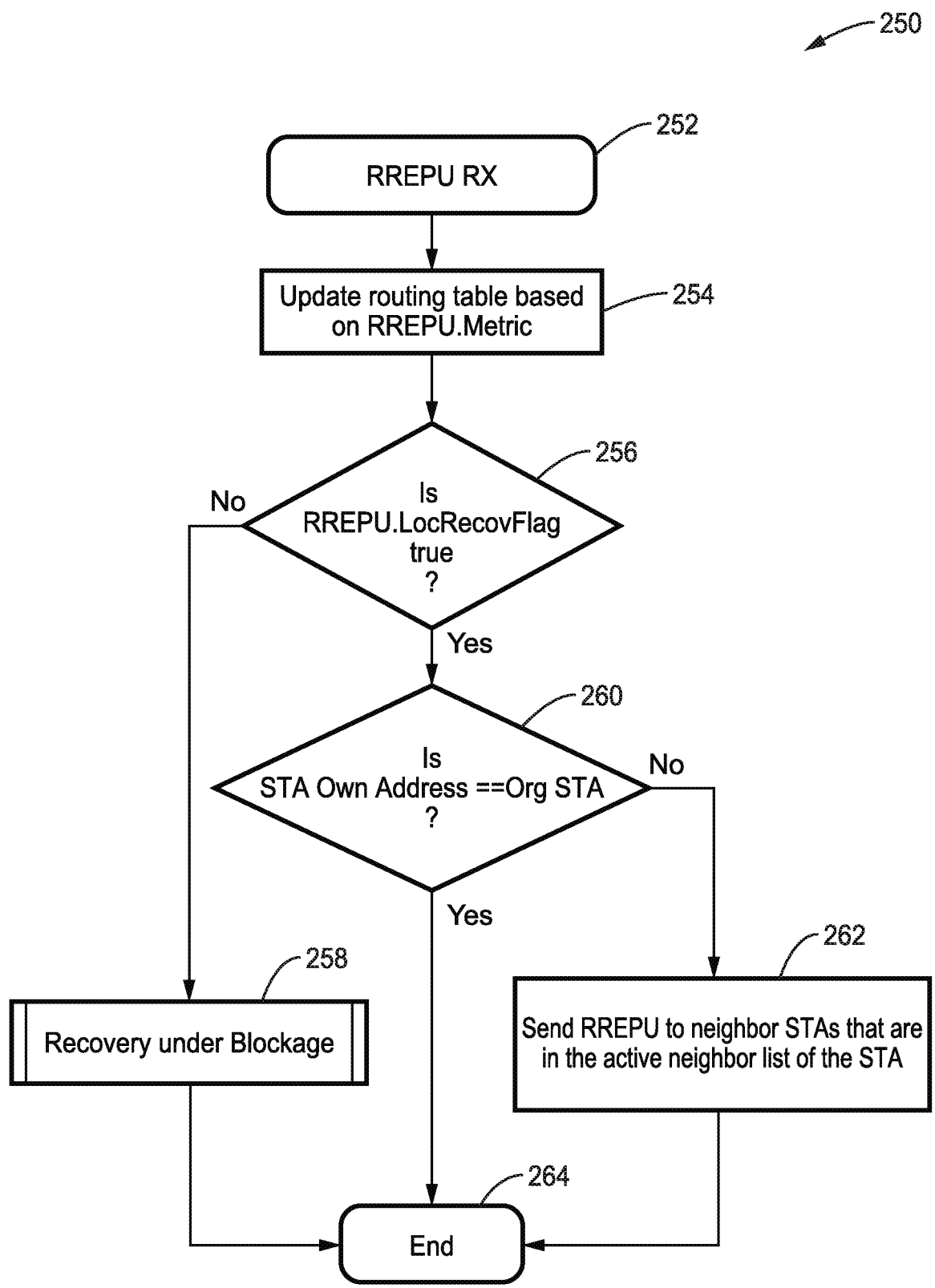
FIG. 23 is a flow diagram of update logic for communicating a route reply update message in response to receiving a route request update message according to an embodiment of the present disclosure.

FIG. 23 illustrates an example embodiment 250 for receiving and processing an RREPU message. When a neighbor STA receives 252 the RREPU with a metric that reflects the blockage situation, it first updates 254 its routing table. Next, a check is made 256 if there has been any local recovery action taken by the transmitter of the RREPU. If there has been no local action taken, then the STA executes the Recovery under Blockage process 258 performing the local action itself, if it is possible, and processing ends 264. However, if there has been a local recovery action, then the STA does not need to take any local action (i.e., it does not need to switch to its backup option). In this case, a check is made 260 if the STA is equal to the original STA. If the address is its own address then execution ends 264, otherwise it propagates 262 the RREPU message to the STAs listed in its own active neighbor list before ending 264.

4.7. Example 1: Blockage at Originating STA with Backup Next Hop

In FIG. 14 an example network topology was shown with four stations, source STA, destination STA, relay STA A, and relay STA B. Each bidirectional link was depicted for this topology with the metric of that link. In this particular example, and for the sake of simplicity, link reciprocity is assumed, meaning that the cost of the link from STA A to STA B is the same as the cost of the link from STA B to STA A. However, it should be appreciated that the disclosed protocol is general and is configured to also operate with networks having non-reciprocal links as well. It is assumed that STA S has run the route discovery process as described in a previous section, and as a result of which the routing table at STA S appears as that seen in Table 1. As a result of this routing protocol, STA S has a backup next-hop option to reach to destination STA D.

Figure 24:
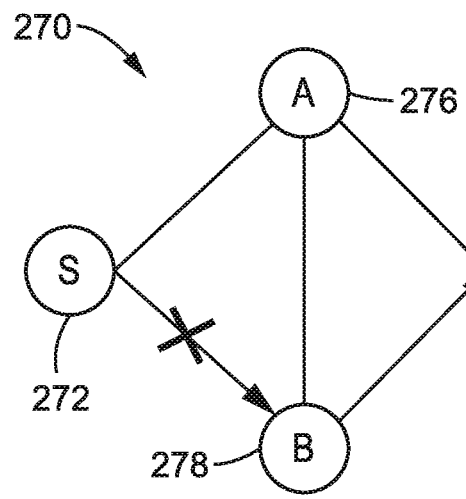
FIG. 24 through FIG. 32 are network topology diagrams of four example stations interacting according to an embodiment of the present disclosure.

FIG. 24 illustrates an example embodiment 270 having STA S 272, STA D 274, with relay STA A 276 and relay STA B 278, and depicting an "X" indicating a link blockage (e.g., could be by human body or other obstruction) between STA S 272 and STA B 278 when communication is attempted along the path from source STA 272 through relay STA B 278 to the destination STA 274.

Under this scenario, the routing table at STA S includes STA A as the backup next-hop to reach STA D, which was shown in Table 1. Therefore, based on the routing table, STA S switches to its backup next-hop (STA A) that is ready to be deployed. This is the local action taken by the STA whose link is blocked. As a result, STA S switches its backup next-hop option with its primary next-hop option. Moreover, there is now no next-hop option to reach to STA B anymore. The updated routing table at STA S is shown in Table 3.

From the routing table at STA A, STA A has knowledge of reaching to STA D. Moreover, through proactive link maintenance being performed as per the disclosure, STA A has up-to-date information in its routing table as shown in Table 4.

As a result of the above, STA A has STA D as the primary next-hop in order to reach to STA D, and therefore STA A sends data traffic to STA D.

Figure 25:
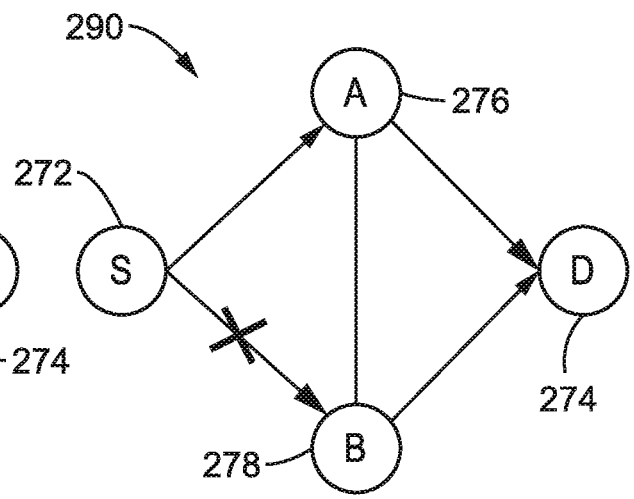

FIG. 25 illustrates an example embodiment 290 of the updated network topology, with communication paths, shown by arrows, connecting from source STA 272, through relay STA A 276 to destination STA 274. In this case, since STA S encounters blockage, and because STA S is the originating STA as well, it does not propagate the RREPU frame as described in FIG. 22.

4.8. Example 2: Blockage at Relay STA Having Backup Next-Hop

Figure 26:
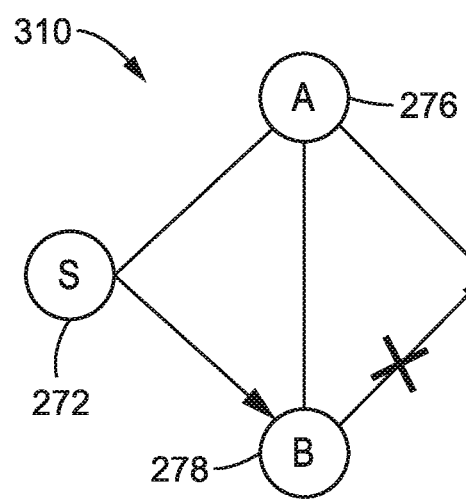

FIG. 26 illustrates an example embodiment 310 of a scenario in which the link from relay STA B 278 to destination STA D 274 is blocked. The routing table at node B is shown in Table 5. From the table, it is seen that STA B has STA A as the backup next-hop in order to reach to destination STA D.

Therefore, upon detection of a broken link, STA B performs a local action of routing traffic to STA A. From the routing table at STA A, STA A has knowledge of reaching to STA D. Moreover, through the use of proactive link maintenance by the disclosure, STA A has up-to-date information in its routing table as shown in Table 6. As a result, STA A has STA D as the primary next-hop in order to reach to STA D, and therefore STA A sends data traffic to STA D.

Figure 27:
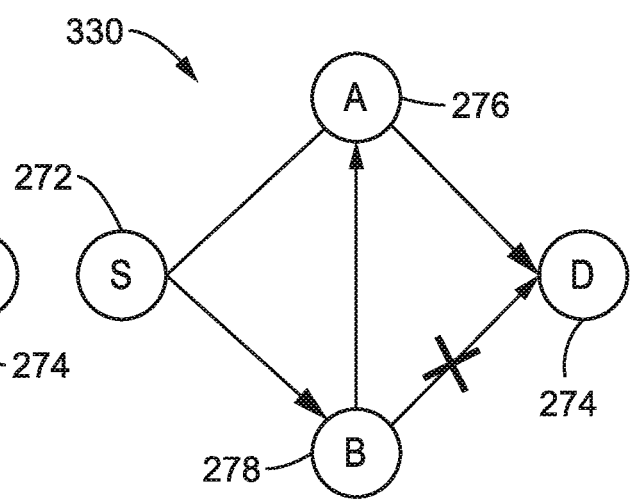

FIG. 27 illustrates an example embodiment 330 of the above operation with data routed from source STA S 272 to relay STA B 278 to relay STA A 276 and finally to destination STA D 274, since STA B has switched to its back next-hop of STA A to reach to STA D. Table 7 depicts an updated routing table of STA B in which the backup next-hop is taken over the primary next-hop in order to reach to destination D.

Figure 28:
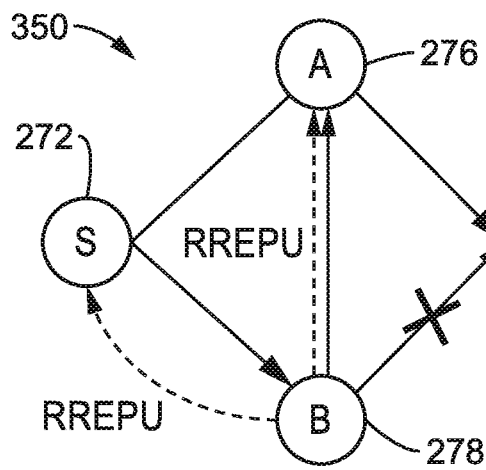

FIG. 28 illustrates an example embodiment 350 of when STA B switches to its backup next-hop through STA A to reach STA D and sends an update. Once STA B switches to its backup next-hop STA, it generates a route reply update (RREPU) in which it sets the LocRecov Flag to be true. STA B sends RREPU messages to those neighbor STAs which rely on STA B for routing purposes. In this case, STA S relies on STA B as the primary next-hop STA to reach to STA D. Moreover, STA A relies on STA B as the backup next-hop option to reach to STA D. Therefore, STA B sends RREPU to both STA S and to STA A as shown by the dashed arrows in the figure which are marked RREPU.

Once STA A receives the RREPU message from STA B, it updates its routing table as well, such that STA B is no longer a backup option to reach to STA D. Therefore, the updated routing table at STA A is shown in Table 8.

From Table 5 it should be noted STA B has the estimated cost metric of reaching to STA D through STA A that is equal to 5, thus the metric included in the RREPU message sent towards STA S has the value of 5. Upon receiving the RREPU at STA S, a comparison is made if the metric of the RREPU with the cost of reaching to STA D through direct link to STA A is already stored in routing table of STA S. In this case, a two-hop route STA S to STA A to STA D has the cost of 8 (from routing table at STA S), while keeping the route fixed by STA B has the cost of 9 (based on the metric in the RREPU). Therefore, according to the present disclosure, STA S thus switches to directly send to STA A instead of sending first to STA B, and the updated routing table at STA S is shown in Table 9.

Figure 29:
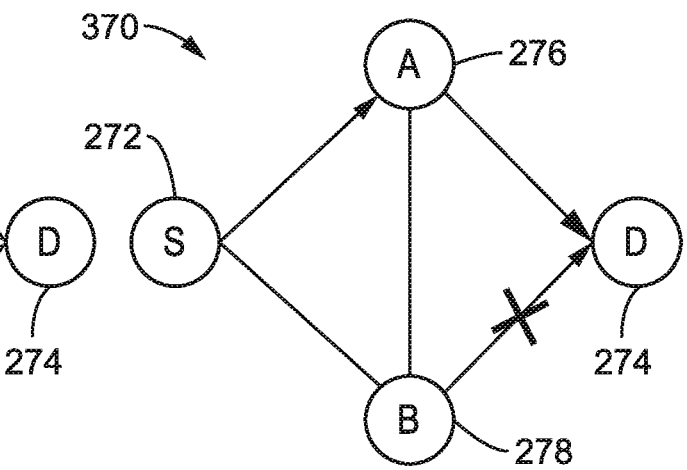

FIG. 29 illustrates an example embodiment 370 of an updated topology after receiving RREPU, and thus allowing STA S to reroute directly through STA A to destination STA D, instead of indirectly through STA B, then to STA A, then to destination STA D.

It should be appreciated from the above steps that the network topology that was seen in FIG. 28 is a transient topology and STA S switches to the global optimal route STA S to STA A to STA D after receiving the RREPU message, resulting in the topology shown in FIG. 29. It should be noted that the transition to the back-up route should be seamless such that the data traffic transmission is not interrupted at all. Therefore, the disclosed method finds a transient topology that is workable and it keeps the end-to-end route alive, and then it finds the global optimal route.

4.9. Example 3: Blockage at Relay STA w/o Backup Next-Hop

In the previous example, a scenario was considered in which the blocked STA had a backup next-hop option to reach to the destination STA. In this example, however, a scenario is considered in which the blocked STA does not have a backup option to switch to.

Figure 30:
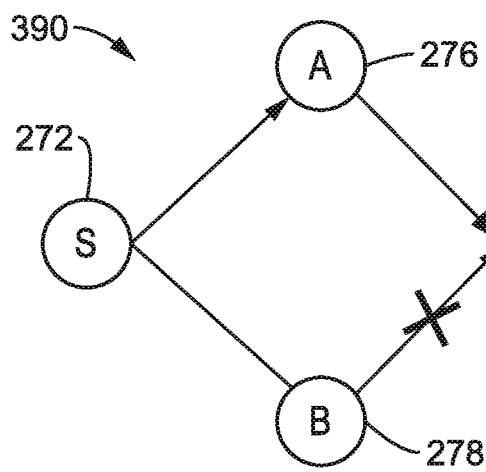

FIG. 30 illustrates an example embodiment 390 in which STA B does not have a backup next-hop option. Now consider the situation in which the link from STA B 278 to STA D 274 is blocked. In this case, STA B does not have any backup next-hop in order to reach STA D, assuming that it has tried all other NLOS (non-line of sight) beams and still cannot reach STA D. Therefore, although STA B needs to switch to a backup next-hop, there is no backup link, and thus STA B cannot take any local recovery action. In this case, STA B sets the local recovery (LocRecov) Flag to false, meaning that it has not taken any local action.

Figure 31:
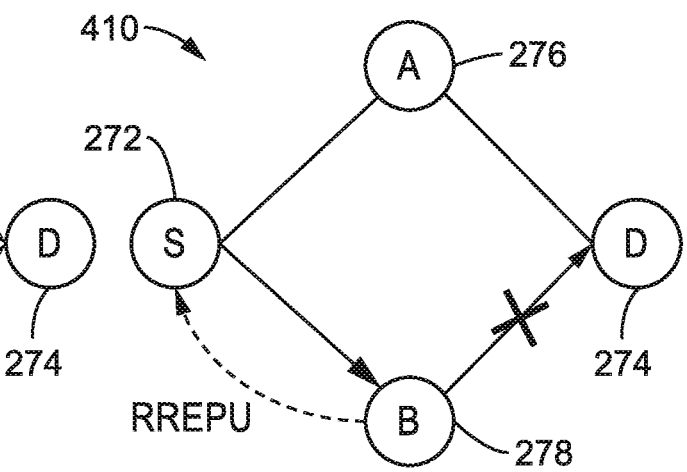

FIG. 31 illustrates an example embodiment 410 in which STA B sends a Route Reply Update (RREPU) message to STA S as a notification that it cannot reach destination STA D, and accordingly it sets the value of metric in the RREPU to infinity. It should be appreciated that in practice the metric need not be set per se to infinity, but only to a very large path length metric value, such as to "999" exemplified in some of the tables of the present disclosure, or to any similar value indicating unsuitability of the path. Upon receiving this packet, STA S compares the cost of sending to STA B (that is now infinity because of the RREPU metric) versus sending to its backup option that is STA A with cost of 8 to reach to STA D. Therefore, STA S switches to its backup next-hop node that is STA A.

Figure 32:
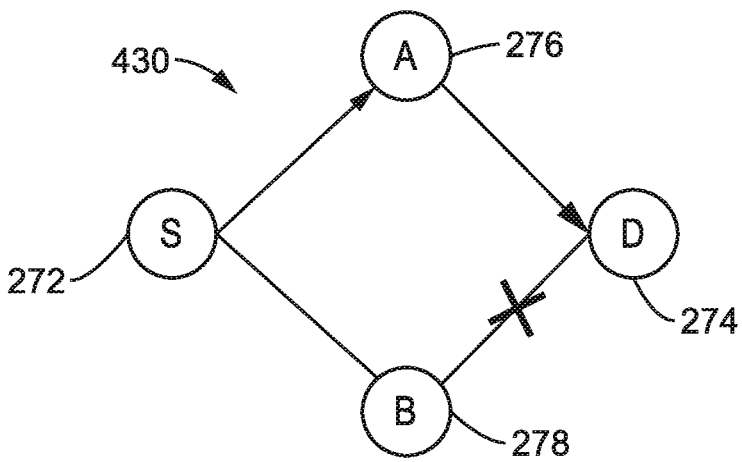

FIG. 32 illustrates an example embodiment 430 of the updated topology in which STA S itself reroutes the traffic through STA A based on the metric information from the RREPU received from STA B.

After this transition, the updated routing table at STA S is shown in Table 10 in which STA S has replaced the route through STA B, with a route through STA A as the primary next-hop to reach to STA D. Moreover, since the link from STA B to STA D is broken/blocked, there is no backup option for STA S to reach to STA D.

From the perspective of STA A it has to update the routing table in order to reach to STA D, which is shown in Table 11. The data traffic is routed from STA S to STA A and then STA A forwards the traffic to STA D without any interruption to find a route.

4.10. Example 4: Blockage at Remote Relay w/o Backup Next-Hop

In the previous example the case was considered that the transmitter of the blocked link did not have any backup options to forward the data traffic to. In that case, the blocked STA sent the RREPU to the originating STA with local recovery (LocRecov) Flag set to false (i.e., no local action was possible since there was no backup option). However, the originating STA was one hop away from the blocked STA and thus it received the RREPU directly from the blocked STA.

Figure 33:
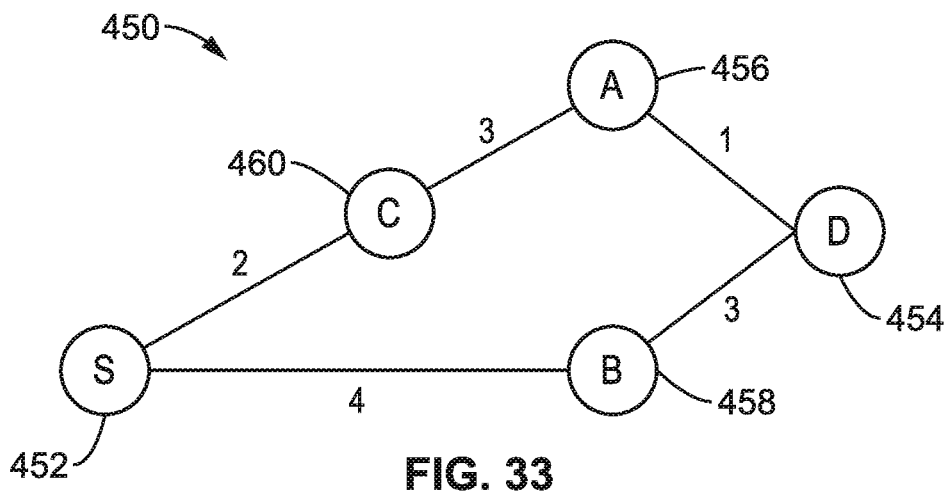
FIG. 33 through FIG. 37 are network topology diagrams of five example stations interacting according to an embodiment of the present disclosure.

FIG. 33 illustrates an example embodiment 450 showing a network topology in which STA S 452 is the source and STA D 454 is the destination, while STA A 456, STA B 458 and STA C 460 are relay stations (nodes). The figure depicts metrics adjacent to the links shown connecting between stations. Before the blockage arises, the following routing tables are obtained for different STAs as previously described. The routing table at STA S is shown in Table 12, the routing table at STA C is seen in Table 13, the routing table at STA A is shown in Table 14, the routing table at STA B is shown in Table 15, and the routing table at STA D is shown in Table 16.

Figure 34:
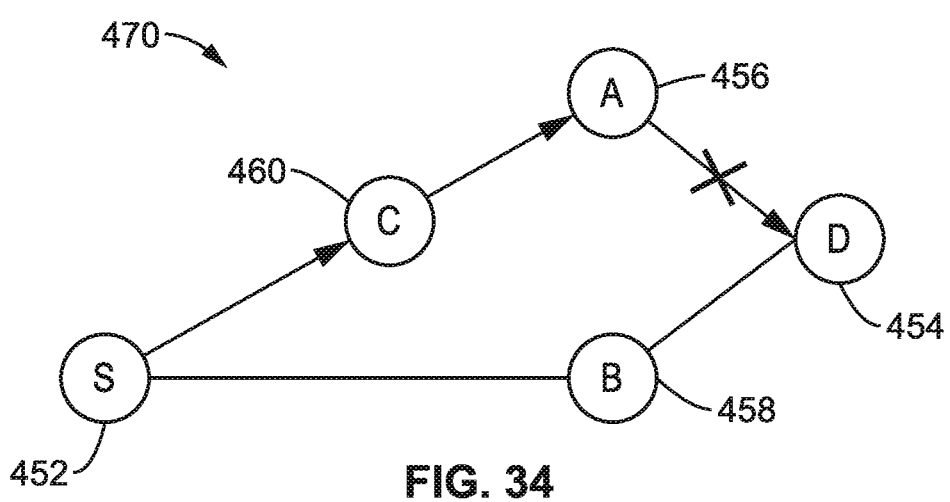

FIG. 34 illustrates an example embodiment 470 in which it is considered that the link from STA A 456 to STA D 454 is blocked. It is seen that the blocked link is two hops away from the originating STA S 452. Similar to the previous example, the blocked STA does not have any backup option to switch to. Once STA A detects blockage, it updates its routing table as shown in Table 17.

Figure 35:
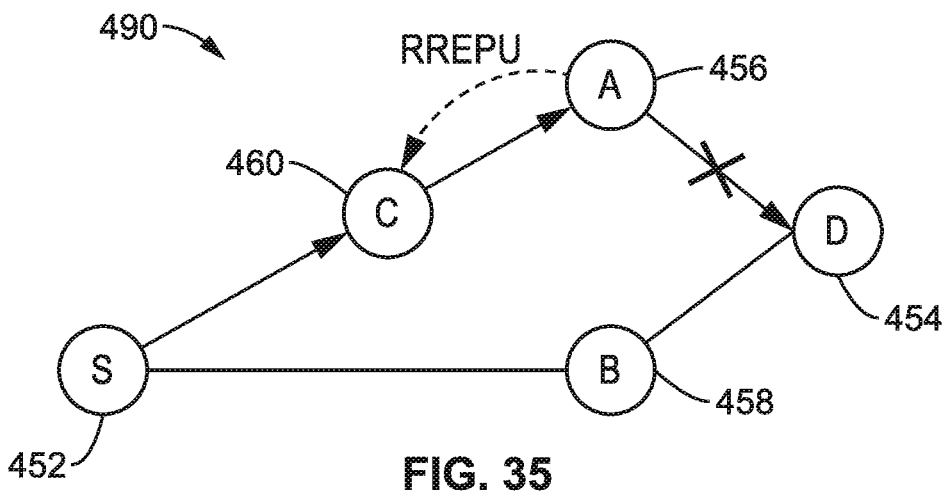

FIG. 35 illustrates an example embodiment 490 of a blocked STA that sends a route reply update to its neighbor STA C. Upon detecting the blockage STA A sends a RREPU message to its active neighbor set that comprises STA C. STA C receives the RREPU message and updates its routing table as shown in Table 18, in which STA A can no longer serve as the next-hop to reach to STA D.

Figure 36:
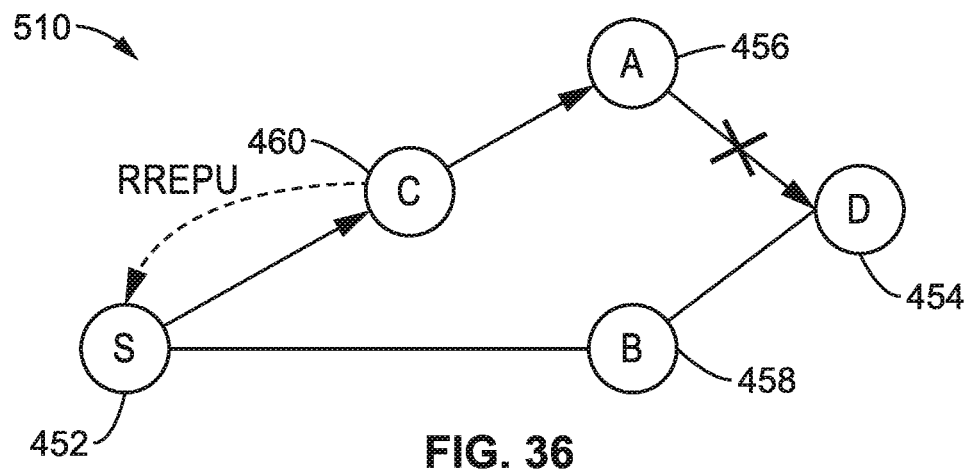

FIG. 36 illustrates an example embodiment 510 of an intermediate (relay) station, STA C 460, that is unable to take any local action because it does not have any backup options, and it forwards an RREPU message to its neighbor STA S 452. Thus, if STA C can take any local action it will take it and switch to its backup option. However, from this network situation, it is seen that STA C does not have any backup options, whereby STA C can only forward the RREPU to its own active neighbor set that only comprises STA S.

Therefore, this process of back-propagation of RREPU message with Local Recovery Flag set to false continues until one of the station nodes has a backup next-hop option to take the local action. The station that takes the local action, then sets the LocRecov Flag to be true. This back-propagation of RREPU continues until it is received by the originating STA which can take more global action by switching to its backup next-hop option.

Figure 37:
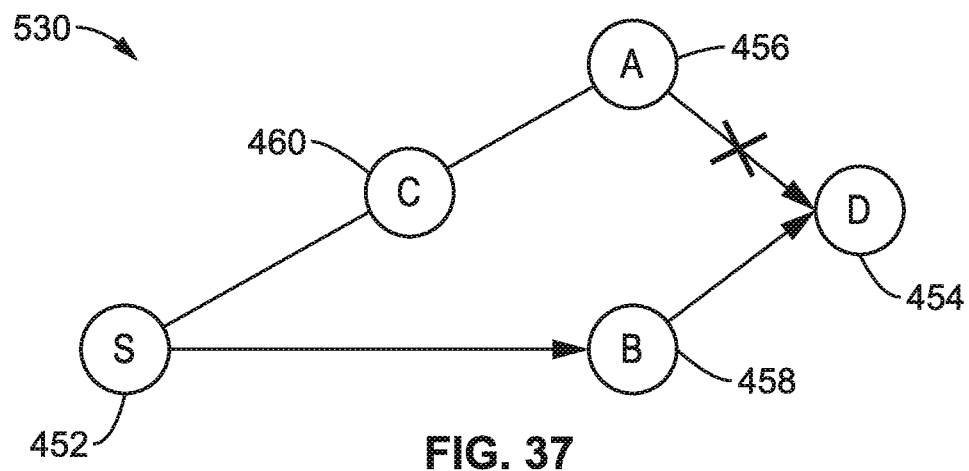

FIG. 37 illustrates an example embodiment 530 of a network topology in which a blocked link is more than one hop away from the originating STA, which receives a propagated RREPU message with LocRecov Flag false, and itself switches to its backup next-hop option that is STA B. The updated routing table at STA S is shown in Table 19 in which STA C is no longer a valid next-hop to reach to STA D, and it is replaced by the backup option. Thereafter, STA B has already established the routing table to reach to STA D according to the routing table in Table 20, and thus it forwards the data packets received from STA S to STA D.

4.11. Replacing a Blocked STA Under Erroneous Conditions

Two major erroneous conditions are considered in the following.

Case 1: When a link is blocked and thus the primary next-hop option is not reachable anymore. The prior examples discussed actions that the transmitter of the blocked link would perform according to the present disclosure in order to restore normal operation of data routing without interruption. In that case the actions included: (a) take the local action and switch to the backup next-hop, if any are available; (b) propagate the route reply update to some of the neighbor STAs; and (c) as a final action the position of the blocked STA in routing tables is replaced, if there are any possible routes.

Case 2: When a backup next-hop option does not respond to the status request (SREQ) messages. Previously the use of status request and status reply messages have been discussed, and when a backup STA does not respond to the status request message, it needs to be replaced with an alternative neighbor STA to assure proactive link maintenance on the backup links as well.

Figure 38:
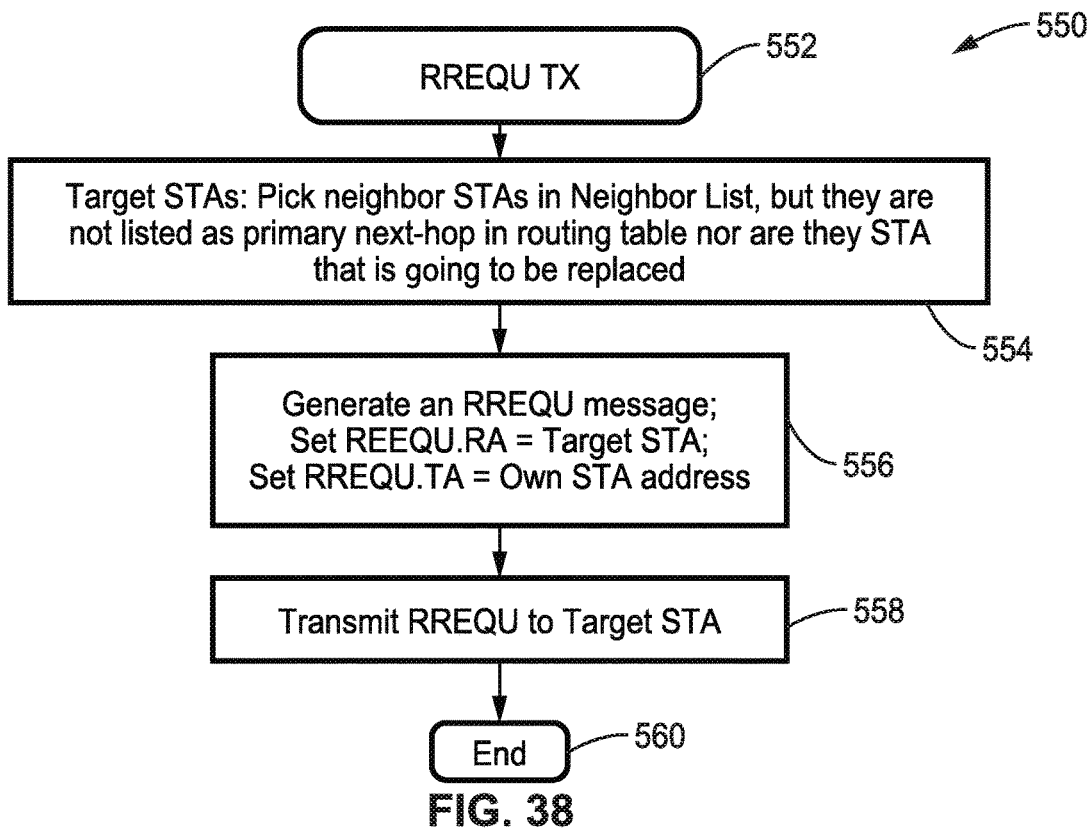
FIG. 38 is a flow diagram of logic for generating and transmitting route request update messages according to an embodiment of the present disclosure.

FIG. 38 illustrates an example embodiment 550 of logic for transmitting an RREQU. In both cases above, if it is possible the transmitter STA will replace the receiver of the blocked link (Case 1) or the backup option that does not respond to the status request (SREQ) message (Case 2). To achieve this goal for both cases above, and from the Neighbor List stored at the transmitter STA, the STA sends a RREQU to the one-hop neighbor nodes, except those neighbors that their up-to-date metrics are available in the routing table of the transmitter STA.

Execution starts at block 552 and the target stations picks (selects) 554 the neighbor STAs that are in the neighbor list, but which are not listed as the primary next-hop in the routing table, nor are they the station that is going to be replaced. Then an RREQU message is created 556, with RREQU.RA set to the Target STA, and RREQU.TA set to its own address, and the RREQU is transmitted 558 to the Target STA, after which the process ends 560.

The one-hop neighbors receive the RREQU frame, they extract the link metric that corresponds to the destination STA requested by the RREQU. Then the STA generates an RREPU message to reply in response to the RREQU message. The RREPU is set with: (a) metric set according to the routing table; (b) original STA of RREPU set equal to the transmitter of the RREQU address; and (c) the local recovery flag is set to true, since there is no blockage from the STA to the destination STA.

Figure 39:
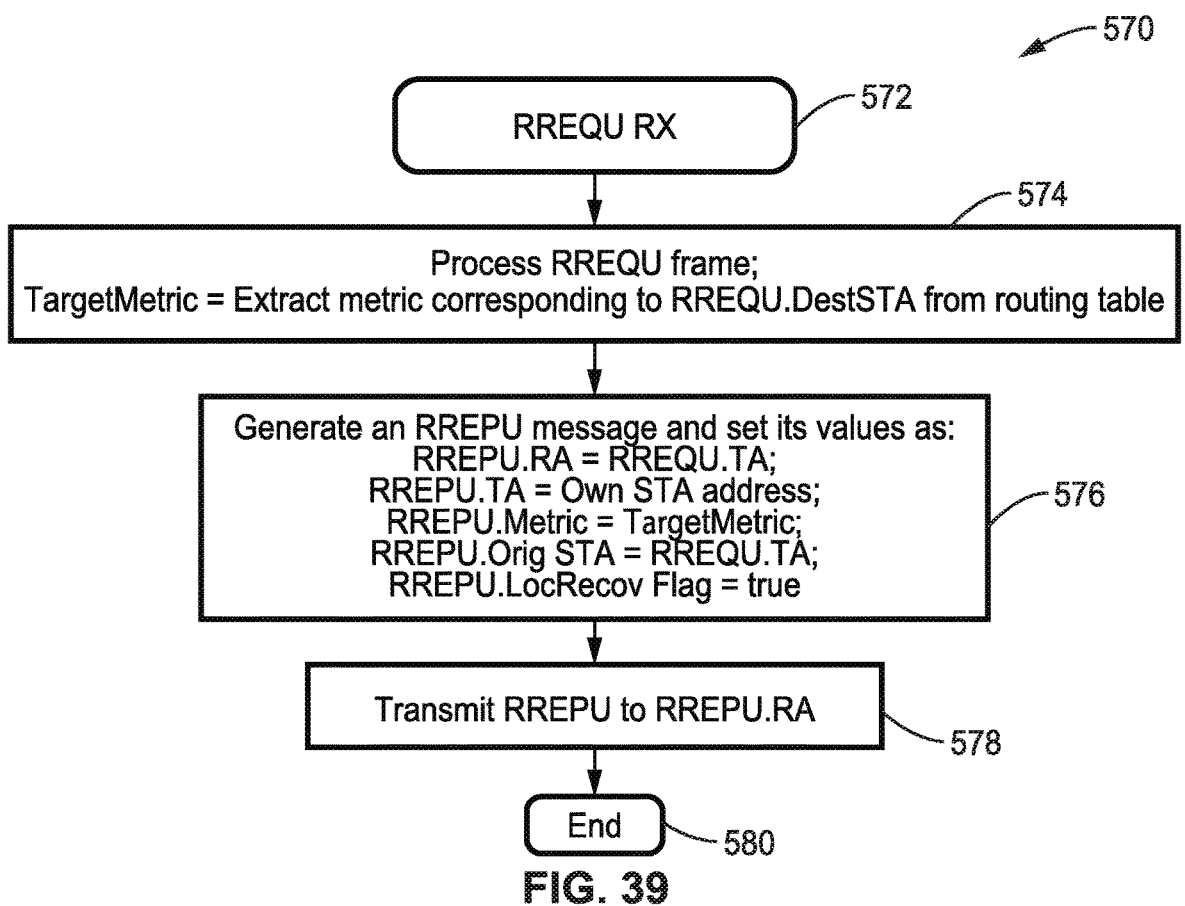
FIG. 39 is a flow diagram of logic for processing a received route request update message and transmitting a corresponding route reply update message according to an embodiment of the present disclosure.

FIG. 39 illustrates an example embodiment 570 of processing a received RREQU message, and generating an RREPU message in reply. Processing starts at block 572 with the received RREQU frame processed at block 574 with the TargetMetric set based on extracting the metric corresponding to RREQU.DestSTA from the routing table. Then an RREPU message is created 576 with RREPU.RA set to RREQU.TA, RREPU.TA set to its own STA address, RREPU.Metric set to TargetMetric, RREPU.Orig STA set to RREQU.TA, and the RREPU.LocRecov Flag set to True. This RREPU message is then transmitted 578 to RREPU.RA and the process ends 580.

The RREPU message is transmitted to the RREQU.TA STA. Once the RREPU is sent, the other STA follows the RREPU RX logic, which was described in FIG. 23.

4.12. Example 5: Finding Replacement STA on Blocked Link

Figure 40:
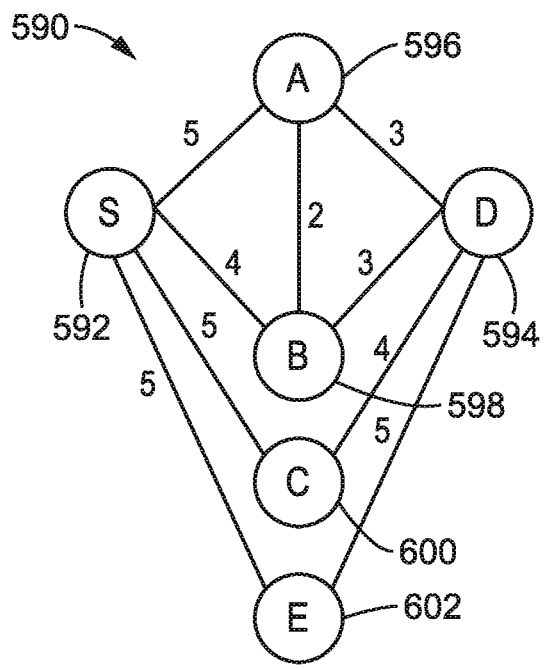
FIG. 40 through FIG. 45 are network topology diagrams of six example stations interacting according to an embodiment of the present disclosure.

FIG. 40 illustrates an example topology 590 where there are more than one backup option for STA S to reach STA D. The figure depicts a source STA S 592, a destination STA D 594, and intermediate stations STA A 596, STA B 598, STA C 600 and STA E 602. Again link metrics (e.g., time cost) for each path is shown adjacent the line representing the path. In this case, the routing table at STA S 592 is shown in Table 21, assuming by way of example and not limitation that STA S keeps track of one backup option in its routing table, whereas the present disclosure is general and can be utilized for maintaining any number of backup options. From Table 21 it is seen that STA B is the primary next-hop to reach to STA D, and STA A is the backup option.

Figure 41:
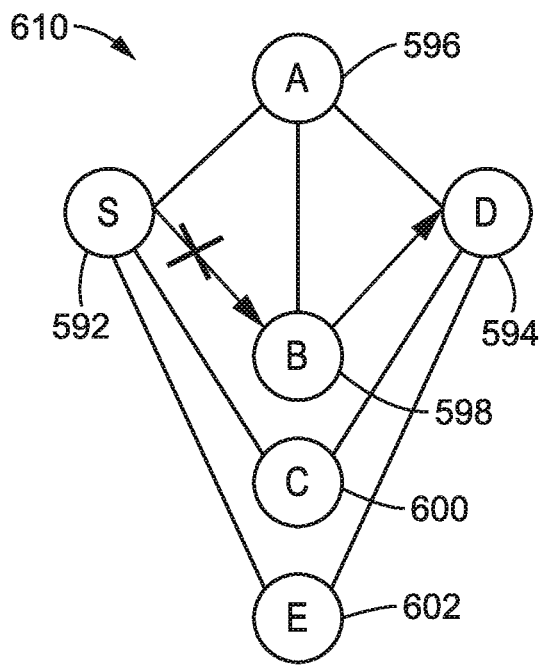

FIG. 41 illustrates an example embodiment 610 of a Case 1 in which it is assumed that the link from STA S to STA B is blocked as shown, between source STA S 592 and intermediate STA B 598.

Figure 42:
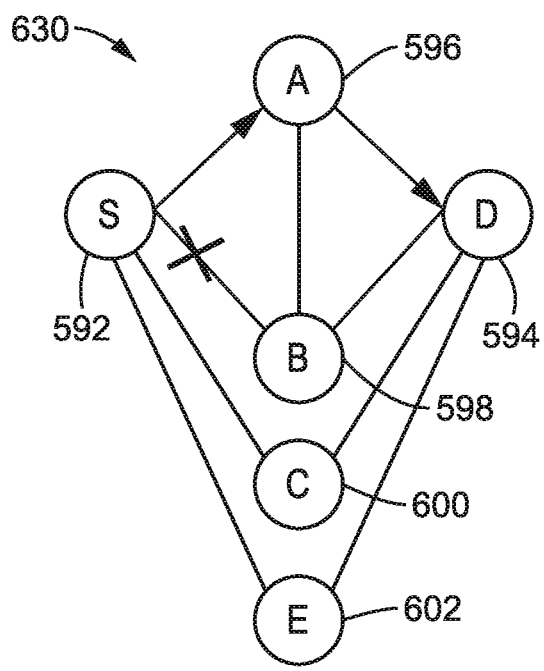

FIG. 42 illustrates an example embodiment 630 for this case, in which STA S 592 switches to its backup next-hop which is STA A 596. STA S then updates its routing table as shown in Table 22, in which STA A becomes the primary next-hop option.

In response to STA S 592 lacking backup options, the programming is configured to fill these empty spots. In this case, STA S 592 sends a route request update (RREQU) to its one-hop neighbors excluding those which are active. In this case, STA A is active, according to the routing table.

Figure 43:
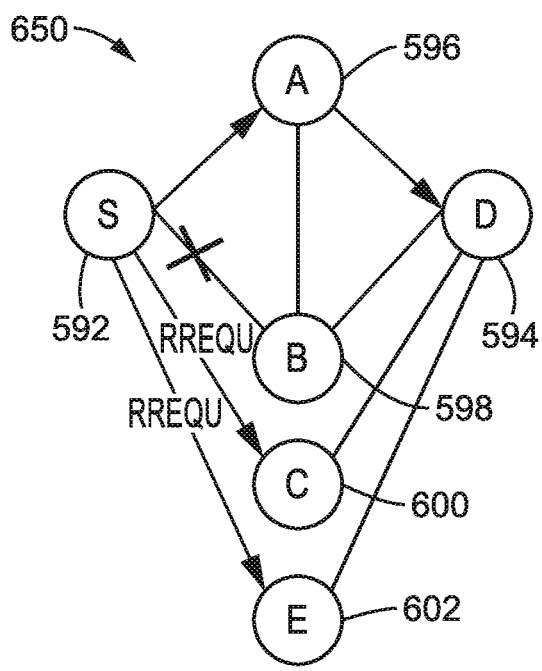

FIG. 43 illustrates an example embodiment 650 in which STA S in configured to obtain information on backup options by sending an RREQU to the other neighbors as represented by STA C 600 and STA E 602. After STA C and STA E receive the RREQU message, they are configured to reply with an RREPU that includes their metric to reach to destination STA D. STA S receives RREPU from STA C and STA E, and compares the path metric. In this case (path metrics shown in FIG. 40) STA C can reach to STA D with a cost of 4, while STA E can reach to STA D at a cost of 5. Therefore, STA S selects STA C as its new backup next-hop option, and updates its routing table as seen in Table 23.

4.13. Example 6: Replacement Backup for Non-Responsive Status

Previous FIG. 40 depicted the topology being considered in this example for Case 2, in which a backup STA does not respond to the status request message. From the previous example, it was seen that STA B was the primary next-hop for source STA S to reach to destination STA D, while STA A is a first backup next-hop option to reach STA D. As previously described, proactive link maintenance is performed for the backup options as well in order to keep them ready to be deployed at any moment.

In the case of STA S 592 having a primary route through STA B 598, with STA A 596 being a good backup route. Consider the case in which status requests messages are sent from STA S to STA A, but STA A does not respond. Thus, the protocol must assume that STA A is not reachable anymore. For example, this unresponsiveness could be a result of STA A not being powered up anymore, or the node has moved away from the coverage range of STA S, or any one of a number of reasons.

Figure 44:
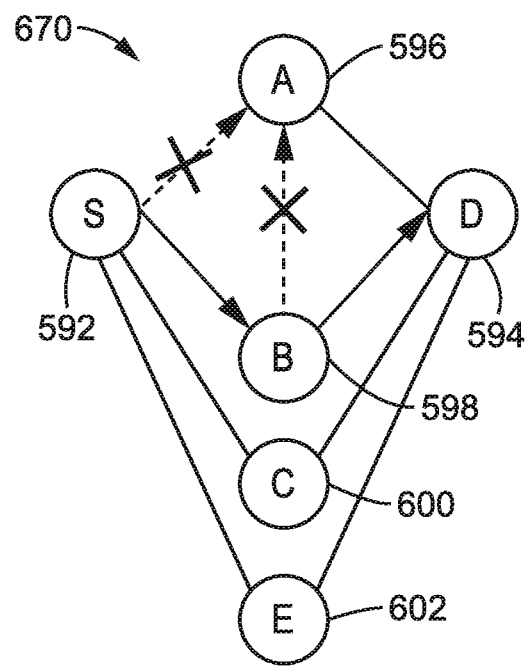

FIG. 44 illustrates an example embodiment 670 for the case in which communicating status request (SREQ) messages from STA S towards STA A fails, as depicted by the dotted arrows seen in the figure from both STA S and from STA B. In this case, STA S and STA B are configured for finding replacement routes which do not include STA A. For STA B, there is no other neighbor STA, and thus there is not much that STA B can do locally. For STA S, there are other neighbor STAs.

Figure 45:
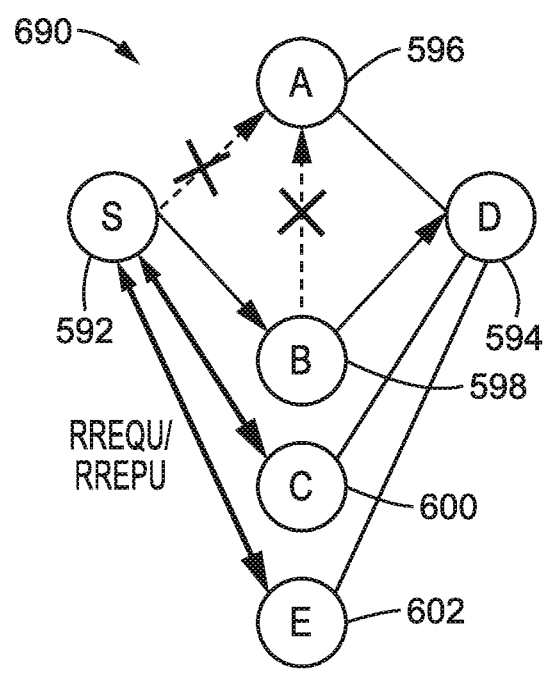

FIG. 45 illustrates an example embodiment 690 in which STA S 592 is seen sending route request update (RREQU) messages towards the remaining neighbor STAs, namely STA C 600 and STA E 602 as seen in the figure. In response to the RREQU, STA C and STA E reply with their RREPU so that one of them will replace STA A in the routing table of STA S. STA S receives an RREPU message from neighbor STA C and STA E, and STA S compares the metric and selects the path with the best metric value (e.g., lowest length/delay, noise, or other factor or combination of factors). Then STA S assigns that node as the new backup next-hop and replaces STA A. As a result, STA S updates the routing table as shown in Table 24 where it replaces STA C as the new backup option.

5. Summary of Disclosure Elements

The following summary discloses certain important elements of the instant disclosure, however the summary is not to be construed as describing the only important elements of the disclosure.

In typical multi-hop network, a route from the originating STA to the destination STA is determined by selecting intermediate STAs for the end-to-end path. Often, the intermediate STAs are chosen so that the links for use offer best link quality, as seen in the AODV example. In wireless systems, such as mmW, links are sensitive to blockage and other channel impairments. However, it is essential in time-sensitive applications for these blocked links to be quickly detected and replaced with an alternative link.

This present disclosure builds upon previous work of the assignee regarding multi-hop routing protocols in which several routing options exist, such as one primary and at least one backup option, to reach to the destination STA.

This present disclosure describes actions performed under this protocol under different error situations, including but not limited to: (a) when a broken link is detected, and (b) when one of the next-hop options is not reachable and when suitable STAs are available it is replaced with another STA.

In order to provide multi-hop communications with options for quickly discovering and recovering under error situations, the disclosed protocol if configured as follows. (a) Under a blockage scenario, a blocked STA is configured to take a local action, if possible, and then update one or more of its neighbor STAs. (b) Each STA proactively assures that its routing table entries are up-to-date and that multiple next-hop options are reachable and ready to be deployed at any time. In this case, if a next-hop STA (either primary or backup) is not reachable (e.g., blocked), the STA sends route request update message to the complement set of its neighbors (excluding those STAs that are reachable) in order to find a replacement for the STA that is not reachable.

Thus, the present disclosure provides a novel mechanism to discover and recover alternative routes under different error conditions such as when a blockage arises or when one of the next-hop STAs to reach to the destination STA is not reachable and thus it needs to be replaced.

6. General Scope of Embodiments

The enhancements described in the presented technology can be readily implemented within the protocols of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following.

1. An apparatus for wireless communication in a network, the apparatus comprising: (a) a wireless communication circuit configured for wirelessly communicating directly, or through one or more hops, with at least one other wireless communication circuit; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) transmitting route discovery messages to neighboring stations when establishing a route that enables communication over multiple hops; (d)(ii) calculating a link metric indicating the desirability of a link in a routing path, upon receipt of a route discovery message, with a neighbor station that transmitted the route discovery message; (d)(iii) responding to reception of a route discovery message by propagating route reply messages to neighbor stations until one or more route reply messages, through one or more paths, is received by an originating station as the station which originally transmitted the route discovery messages; and (d)(iv) detecting blockage conditions along a route between a source station and a destination station and performing local actions to select another route if it is available, followed by communicating route status information to one or more neighbor stations, with each station proactively assuring that its routing table entries are up-to-date and that multiple next-hop options are reachable and ready to be deployed at any time.

2. A method of performing wireless communication in a network, comprising steps of: (a) transmitting route discovery messages from a wireless communication circuit configured for wirelessly communicating to neighboring stations when establishing a route that enables communication over multiple hops; (b) calculating a link metric indicating the desirability of a link in a routing path, upon receipt of a route discovery message, with a neighbor station that transmitted the route discovery message; (c) responding to reception of a route discovery message by propagating route reply messages to neighboring stations until one or more route reply messages, through one or more paths, is received by an originating station as the station which originally transmitted the route discovery messages; and (d) detecting blockage conditions along a route between a source station and a destination station and performing local actions to select another route if it is available, followed by communicating route status information to one or more neighbor stations, with each station proactively assuring that its routing table entries are up-to-date and that multiple next-hop options are reachable and ready to be deployed at any time.

3. The apparatus or method of any preceding embodiment, wherein said instructions when executed by the processor further perform one or more steps comprising sending one or more routing request update messages to neighboring stations, exclusive of stations which are reachable, when either primary or backup next-hop stations are not reachable towards finding a replacement for the station that is not reachable.

4. The apparatus or method of any preceding embodiment, wherein each of said one or more routing request update messages comprises information on type of the frame, recipient address (RA), transmitter address (TA), frame length, originating station address, destination station address, a sequence number identifying this route request update; lifetime to the expiration time of this route reply, a traffic identification for an associated traffic stream and its traffic specification, and antenna sector plus access timing information.

5. The apparatus or method of any preceding embodiment, wherein said instructions when executed by the processor further perform one or more steps comprising responding to receipt of one of said routing request update messages by sending a routing reply update message.

6. The apparatus or method of any preceding embodiment, wherein each of said one or more routing reply update messages comprises information on type of the frame, recipient address (RA), transmitter address (TA), frame length, originating station address, destination station address, a sequence number identifying this route request update, an accumulated metric on connection length and/or quality, lifetime to the expiration time of this route reply, a traffic identification for an associated traffic stream and its traffic specification, antenna sector plus access timing information, and a local recovery flag true indicating a station has performed a local action and switched to its backup next-hop STA.

7. The apparatus or method of any preceding embodiment, wherein said detecting blockage conditions determines a route blockage based on detecting a lack of acknowledgement from a receiver along the route, or receiving a route reply update (RREPU) message announcing that there is a link blockage.

8. The apparatus or method of any preceding embodiment, wherein a routing reply update (RREPU) message is transmitted, containing an indication that no local recovery was performed, by a station that detects a route blockage, but has no next hop option to reach to the destination station.

9. The apparatus or method of any preceding embodiment, wherein upon receiving the routing reply update (RREPU) message, another station back propagates the RREPU message indicating no local recovery was performed to other stations until one of the stations receiving back propagated routing reply update (RREPU) messages has a backup next-hop option to overcome the blockage.

10. The apparatus or method of any preceding embodiment, wherein a routing reply update (RREPU) message is transmitted, containing an indication that local recovery was performed, by a station that detects a route blockage and performs a local action of switching to a backup routing.

11. The apparatus or method of any preceding embodiment, wherein in response to receiving the routing reply update (RREPU) message, if it is determined that a route exists which is more efficient than that route determined by the local recovery, then a transition is made to this more efficient route.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Routing Table at STA S

| Destination | A | B | D |
|---|---|---|---|
| NextHop | A | B | B |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 2

Forwarding Table at STA S

| Neighbor | A | B |
|---|---|---|
| Origin STA | S | S |
| Seq. Number | 0 | 0 |
| Type | RREQ | RREQ |
| Metric | N/A | N/A |

TABLE 3

Updated Routing Table at Node S after Blockage

| Destination | A | B | D |
|---|---|---|---|
| NextHop | A | N/A | A |
| Metric | 5 | N/A | 8 |
| Lifetime | 999 | N/A | 999 |
| Backup NextHop | N/A | N/A | N/A |
| Backup Metric | N/A | N/A | N/A |
| Backup Lifetime | N/A | N/A | N/A |

TABLE 4

Routing Table at Node A

| Destination | S | B | D |
|---|---|---|---|
| NextHop | S | B | D |
| Metric | 5 | 2 | 3 |
| Lifetime | 999 | 999 | 999 |
| Backup NextHop | B | N/A | B |
| Backup Metric | 6 | N/A | 5 |
| Backup Lifetime | 999 | N/A | 999 |

TABLE 5

Routing Table at B having Backup Next-hop to D

| Destination | S | A | D |
|---|---|---|---|
| NextHop | S | A | D |
| Metric | 4 | 2 | 3 |
| Lifetime | 999 | 999 | 999 |
| Backup NextHop | A | N/A | A |
| Backup Metric | 7 | N/A | 5 |
| Backup Lifetime | 999 | N/A | 999 |

TABLE 6

Routing Table at Station A

| Destination | S | B | D |
|---|---|---|---|
| NextHop | S | B | D |
| Metric | 5 | 2 | 3 |
| Lifetime | 999 | 999 | 999 |
| Backup NextHop | B | N/A | B |
| Backup Metric | 6 | N/A | 5 |
| Backup Lifetime | 999 | N/A | 999 |

TABLE 7

Updated Routing Table at Station B

| Destination | S | A | D |
| --- | --- | --- | --- |
| NextHop | S | A | A |
| Metric | 4 | 2 | 5 |
| Lifetime | 999 | 999 | 999 |
| Backup NextHop | A | N/A | N/A |
| Backup Metric | 7 | N/A | N/A |
| Backup Lifetime | 999 | N/A | N/A |

TABLE 8

Updated Routing Table at Station A

| Destination | S | B | D |
| --- | --- | --- | --- |
| NextHop | S | B | D |
| Metric | 5 | 2 | 3 |
| Lifetime | 999 | 999 | 999 |
| Backup NextHop | B | N/A | N/A |
| Backup Metric | 6 | N/A | N/A |
| Backup Lifetime | 999 | N/A | N/A |

TABLE 9

Updated Routing Table at Station S after Receiving RREPU

| Destination | A | B | D |
| --- | --- | --- | --- |
| NextHop | A | B | A |
| Metric | 5 | 4 | 8 |
| Lifetime | 999 | 999 | 999 |
| Backup NextHop | N/A | N/A | B |
| Backup Metric | N/A | N/A | 9 |
| Backup Lifetime | N/A | N/A | 999 |

TABLE 10

Updated Routing Table at Station S after Receiving RREPU

| Destination | A | B | D |
| --- | --- | --- | --- |
| NextHop | A | B | A |
| Metric | 5 | 4 | 8 |
| Lifetime | 999 | 999 | 999 |
| Backup NextHop | N/A | N/A | N/A |
| Backup Metric | N/A | N/A | N/A |
| Backup Lifetime | N/A | N/A | N/A |

TABLE 11

Routing Table at Station A

| Destination | S | B | D |
| --- | --- | --- | --- |
| NextHop | S | N/A | D |
| Metric | 5 | N/A | 3 |
| Lifetime | 999 | N/A | 999 |
| Backup NextHop | N/A | N/A | N/A |
| Backup Metric | N/A | N/A | N/A |
| Backup Lifetime | N/A | N/A | N/A |

TABLE 12

Routing Table at Station S

| Destination | C | A | B | D |
| --- | --- | --- | --- | --- |
| NextHop | C | C | B | C |
| Metric | 2 | 5 | 4 | 6 |
| Lifetime | 999 | 999 | 999 | 999 |
| Backup NextHop | N/A | N/A | N/A | B |
| Backup Metric | N/A | N/A | N/A | 7 |
| Backup Lifetime | N/A | N/A | N/A | 999 |

TABLE 13

Routing Table at Station C

| Destination | S | A | B | D |
| --- | --- | --- | --- | --- |
| NextHop | S | A | N/A | A |
| Metric | 2 | 3 | N/A | 4 |
| Lifetime | 999 | 999 | N/A | 999 |
| Backup NextHop | N/A | N/A | N/A | N/A |
| Backup Metric | N/A | N/A | N/A | N/A |
| Backup Lifetime | N/A | N/A | N/A | N/A |

TABLE 14

Routing Table at Station A

| Destination | S | C | B | D |
| --- | --- | --- | --- | --- |
| NextHop | C | C | N/A | D |
| Metric | 5 | 3 | N/A | 1 |
| Lifetime | 999 | 999 | N/A | 999 |
| Backup NextHop | N/A | N/A | N/A | N/A |
| Backup Metric | N/A | N/A | N/A | N/A |
| Backup Lifetime | N/A | N/A | N/A | N/A |

TABLE 15

Routing Table at Station B

| Destination | S | C | A | D |
| --- | --- | --- | --- | --- |
| NextHop | S | N/A | N/A | D |
| Metric | 4 | N/A | N/A | 3 |
| Lifetime | 999 | N/A | N/A | 999 |
| Backup NextHop | N/A | N/A | N/A | N/A |
| Backup Metric | N/A | N/A | N/A | N/A |
| Backup Lifetime | N/A | N/A | N/A | N/A |

TABLE 16

Routing Table at Station D

| Destination | S | C | A | B |
| --- | --- | --- | --- | --- |
| NextHop | A | A | A | B |
| Metric | 6 | 4 | 1 | 3 |
| Lifetime | 999 | 999 | 999 | 999 |
| Backup NextHop | B | N/A | N/A | N/A |
| Backup Metric | 7 | N/A | N/A | N/A |
| Backup Lifetime | 999 | N/A | N/A | N/A |

TABLE 17

Updated Routing Table at Station A after Detecting Blockage

| Destination | S | C | B | D |
|---|---|---|---|---|
| NextHop | C | C | N/A | N/A |
| Metric | 5 | 3 | N/A | N/A |
| Lifetime | 999 | 999 | N/A | N/A |
| Backup NextHop | N/A | N/A | N/A | N/A |
| Backup Metric | N/A | N/A | N/A | N/A |
| Backup Lifetime | N/A | N/A | N/A | N/A |

TABLE 18

Updated Routing Table at Station C after Receiving RREPU

| Destination | S | A | B | D |
|---|---|---|---|---|
| NextHop | S | A | N/A | N/A |
| Metric | 2 | 3 | N/A | N/A |
| Lifetime | 999 | 999 | N/A | N/A |
| Backup NextHop | N/A | N/A | N/A | N/A |
| Backup Metric | N/A | N/A | N/A | N/A |
| Backup Lifetime | N/A | N/A | N/A | N/A |

TABLE 19

Updated Routing Table at Station S

| Destination | C | A | B | D |
|---|---|---|---|---|
| NextHop | C | C | B | B |
| Metric | 2 | 5 | 4 | 7 |
| Lifetime | 999 | 999 | 999 | 999 |
| Backup NextHop | N/A | N/A | N/A | N/A |
| Backup Metric | N/A | N/A | N/A | N/A |
| Backup Lifetime | N/A | N/A | N/A | N/A |

TABLE 20

Routing Table at Station B

| Destination | S | C | A | D |
|---|---|---|---|---|
| NextHop | S | N/A | N/A | D |
| Metric | 4 | N/A | N/A | 3 |
| Lifetime | 999 | N/A | N/A | 999 |
| Backup NextHop | N/A | N/A | N/A | N/A |
| Backup Metric | N/A | N/A | N/A | N/A |
| Backup Lifetime | N/A | N/A | N/A | N/A |

TABLE 21

Routing Table at Station S

| Destination | A | B | C | E | D |
|---|---|---|---|---|---|
| NextHop | A | B | C | E | B |
| Metric | 5 | 4 | 5 | 5 | 7 |
| Lifetime | 999 | 999 | 999 | 999 | 999 |
| Backup NextHop | N/A | N/A | N/A | N/A | A |
| Backup Metric | N/A | N/A | N/A | N/A | 8 |
| Backup Lifetime | N/A | N/A | N/A | N/A | 999 |

TABLE 22

Updated Routing Table at Station S after Blockage

| Destination | A | B | C | E | D |
|---|---|---|---|---|---|
| NextHop | A | B | C | E | A |
| Metric | 5 | 4 | 5 | 5 | 8 |
| Lifetime | 999 | 999 | 999 | 999 | 999 |
| Backup NextHop | N/A | N/A | N/A | N/A | N/A |
| Backup Metric | N/A | N/A | N/A | N/A | N/A |
| Backup Lifetime | N/A | N/A | N/A | N/A | N/A |

TABLE 23

Updated Routing Table at Station S after RREPU from Stations C and E

| Destination | A | B | C | E | D |
|---|---|---|---|---|---|
| NextHop | A | N/A | C | E | A |
| Metric | 5 | N/A | 5 | 5 | 8 |
| Lifetime | 999 | N/A | 999 | 999 | 999 |
| Backup NextHop | N/A | N/A | N/A | N/A | C |
| Backup Metric | N/A | N/A | N/A | N/A | 9 |
| Backup Lifetime | N/A | N/A | N/A | N/A | 999 |

TABLE 24

Updated Routing Table at Station S after RREPU from Stations C and E

| Destination | A | B | C | E | D |
|---|---|---|---|---|---|
| NextHop | N/A | B | C | E | B |
| Metric | N/A | 4 | 5 | 5 | 7 |
| Lifetime | N/A | 999 | 999 | 999 | 999 |
| Backup NextHop | N/A | N/A | N/A | N/A | C |
| Backup Metric | N/A | N/A | N/A | N/A | 9 |
| Backup Lifetime | N/A | N/A | N/A | N/A | 999 |

What is claimed is:

1. An apparatus for wireless communication in a network, the apparatus comprising:
   (a) a wireless communication circuit configured for wirelessly communicating directly, or through one or more hops, with at least one other wireless communication circuit;
   (b) a processor coupled to said wireless communication circuit within a station configured for operating on a wireless network;
   (c) a non-transitory memory storing instructions executable by the processor; and
   (d) wherein said instructions, when executed by the processor, perform steps comprising:
      (i) transmitting route discovery messages, as routing request and routing reply messages, to neighboring stations when establishing a route that enables communication over multiple hops;
      (ii) calculating a link metric indicating the desirability of a link in a routing path, upon receipt of a route discovery message, with a neighbor station that transmitted the route discovery message;
      (iii) responding to reception of a route discovery message by propagating route reply messages to neighbor stations until one or more route reply messages, through one or more paths, is received by an originating station as the station which originally transmitted the route discovery messages;

(iv) maintaining, by each station, a routing table with both primary and backup routes indicating next hop stations and link metrics, and each station proactively generating status request messages, and responding to status request messages with status reply messages, toward maintaining an active neighbor list assuring that its routing table entries are valid and that multiple next-hop options are reachable and ready to be deployed at any time; and (v) detecting blockage conditions along a route between a source station and a destination station and performing local actions by a station whose next-hop station, either primary or secondary, is unreachable to select another route from the routing table if it is available, followed by communicating route status information using route request update and route reply update messages from that station to one or more neighbor stations.

2. The apparatus of claim 1, wherein said instructions when executed by the processor further perform one or more steps comprising sending one or more routing request update messages, as route request update and route reply update messages in response to local actions by a station whose next-hop station, either primary or secondary, is unreachable to neighboring stations, exclusive of stations which are reachable, when either primary or backup next-hop stations are not reachable towards finding a replacement for the station that is not reachable.

3. The apparatus of claim 2, wherein each of said one or more routing request update messages comprises information on type of the frame, recipient address (RA), transmitter address (TA), frame length, originating station address, destination station address, a sequence number identifying this route request update;

lifetime to the expiration time of this route reply, a traffic identification for an associated traffic stream and its traffic specification, and antenna sector plus access timing information.

4. The apparatus of claim 2, wherein said instructions when executed by the processor further perform one or more steps comprising responding to receipt of one of said routing request update messages by sending a routing reply update message.

5. The apparatus of claim 4, wherein each of said one or more routing reply update messages comprises information on type of the frame, recipient address (RA), transmitter address (TA), frame length, originating station address, destination station address, a sequence number identifying this route request update, an accumulated metric on connection length and/or quality, lifetime to the expiration time of this route reply, a traffic identification for an associated traffic stream and its traffic specification, antenna sector plus access timing information, and a local recovery flag true indicating a station has performed a local action and switched to its backup next-hop STA.

6. The apparatus of claim 1, wherein said detecting blockage conditions determines a route blockage based on detecting a lack of acknowledgement from a receiver along the route, or receiving a route reply update (RREPU) message announcing that there is a link blockage.

7. The apparatus of claim 1, wherein a routing reply update (RREPU) message is transmitted, containing an indication that no local recovery was performed, by a station that detects a route blockage, but has no next hop option to reach to the destination station.

8. The apparatus of claim 7, wherein upon receiving the routing reply update (RREPU) message, another station back propagates the RREPU message indicating no local recovery was performed to other stations until one of the stations receiving back propagated routing reply update (RREPU) messages has a backup next-hop option to overcome the blockage.

9. The apparatus of claim 1, wherein a routing reply update (RREPU) message is transmitted, containing an indication that local recovery was performed, by a station that detects a route blockage and performs a local action of switching to a backup routing.

10. The apparatus of claim 9, wherein in response to receiving the routing reply update (RREPU) message, if it is determined that a route exists which is more efficient than that route determined by the local recovery, then a transition is made to this more efficient route.

11. An apparatus for wireless communication in a network, the apparatus comprising:

(a) a wireless communication circuit configured for wirelessly communicating directly, or through one or more hops, with at least one other wireless communication circuit;

(b) a processor coupled to said wireless communication circuit within a station configured for operating on a wireless network;

(c) a non-transitory memory storing instructions executable by the processor; and (d) wherein said instructions, when executed by the processor, perform steps comprising:

(i) transmitting route discovery messages, as routing request and routing reply messages, to neighboring stations when establishing a route that enables communication over multiple hops;

(ii) calculating a link metric indicating the desirability of a link in a routing path, upon receipt of a route discovery message, with a neighbor station that transmitted the route discovery message;

(iii) responding to reception of a route discovery message by propagating route reply messages to neighbor stations until one or more route reply messages, through one or more paths, is received by an originating station as the station which originally transmitted the route discovery messages;

(iv) maintaining, by each station, a routing table with both primary and backup routes indicating next hop stations and link metrics, and each station proactively generating status request messages, and responding to status request messages with status reply messages, toward maintaining an active neighbor list assuring that its routing table entries are valid and that multiple next-hop options are reachable and ready to be deployed at any time;

(v) detecting blockage conditions along a route between a source station and a destination station and performing local actions by a station whose next-hop station, either primary or secondary, is unreachable to select another route from the routing table if it is available, followed by communicating route status information using route request update and route reply update messages from that station to one or more neighbor stations; and (vi) sending said route request update and route reply update messages as one or more routing request update messages, in response to local actions by a station whose next-hop station is unreachable, to neighboring stations, exclusive of stations which are reachable, when either primary or backup next-hop stations are not reachable towards finding a replacement for the station that is not reachable.

12. The apparatus of claim 11, wherein each of said one or more routing request update messages comprises information on type of the frame, recipient address (RA), transmitter address (TA), frame length, originating station address, destination station address, a sequence number identifying this route request update;
lifetime to the expiration time of this route reply, a traffic identification for an associated traffic stream and its traffic specification, and antenna sector plus access timing information.

13. The apparatus of claim 11, wherein said instructions when executed by the processor further perform one or more steps comprising responding to receipt of one of said routing request update messages by sending a routing reply update message.

14. The apparatus of claim 13, wherein each of said one or more routing reply update messages comprises information on type of the frame, recipient address (RA), transmitter address (TA), frame length, originating station address, destination station address, a sequence number identifying this route request update, an accumulated metric on connection length and/or quality, lifetime to the expiration time of this route reply, a traffic identification for an associated traffic stream and its traffic specification, antenna sector plus access timing information, and a local recovery flag true indicating a station has performed a local action and switched to its backup next-hop STA.

15. The apparatus of claim 11, wherein said detecting blockage conditions determines a route blockage based on detecting a lack of acknowledgement from a receiver along the route, or receiving a route reply update (RREPU) message announcing that there is a link blockage.

16. The apparatus of claim 11, wherein a routing reply update (RREPU) message is transmitted, containing an indication that no local recovery was performed, by a station that detects a route blockage, but has no next hop option to reach to the destination station.

17. The apparatus of claim 16, wherein upon receiving the routing reply update (RREPU) message, another station back propagates the RREPU message indicating no local recovery was performed to other stations until one of the stations receiving back propagated routing reply update (RREPU) messages has a backup next-hop option to overcome the blockage.

18. The apparatus of claim 11, wherein a routing reply update (RREPU) message is transmitted, containing an indication that local recovery was performed, by a station that detects a route blockage and performs a local action of switching to a backup routing.

19. The apparatus of claim 18, wherein in response to receiving the routing reply update (RREPU) message, if it is determined that a route exists which is more efficient than that route determined by the local recovery, then a transition is made to this more efficient route.

20. A method of performing wireless communication in a network, comprising steps of:
(a) transmitting route discovery messages from a wireless communication circuit configured for wirelessly communicating to neighboring stations when establishing a route that enables communication over multiple hops;
(b) calculating a link metric indicating the desirability of a link in a routing path, upon receipt of a route discovery message, with a neighbor station that transmitted the route discovery message;
(c) responding to reception of a route discovery message by propagating route reply messages to neighboring stations until one or more route reply messages, through one or more paths, is received by an originating station as the station which originally transmitted the route discovery messages;
(d) maintaining, by each station, a routing table with both primary and backup routes indicating next hop stations and link metrics, and each station proactively generating status request messages, and responding to status request messages with status reply messages, toward maintaining an active neighbor list assuring that its routing table entries are valid and that multiple next-hop options are reachable and ready to be deployed at any time; and
(e) detecting blockage conditions along a route between a source station and a destination station and performing local actions by a station whose next-hop station, either primary or secondary, is unreachable to select another route from the routing table if it is available, followed by communicating route status information using route request update and route reply update messages from that station to one or more neighbor stations.

* * * * *